US012398597B2

(12) United States Patent
Parker et al.

(10) Patent No.: US 12,398,597 B2
(45) Date of Patent: Aug. 26, 2025

(54) LADDER AND LADDER TOP

(71) Applicant: Werner Co., Greenville, PA (US)

(72) Inventors: Thomas W. Parker, Jamestown, PA (US); Daniel C. Mora, Transfer, PA (US); Robert D. Beggs, Stoneboro, PA (US); Tek Lentine, Greenville, PA (US); Joseph C. Dangrow, Mercer, PA (US); Adam C Field, Cochranton, PA (US); Brent Sedlacek, Elmhurst, IL (US)

(73) Assignee: Werner Co., Greenville, PA (US)

( * ) Notice: Subject to any disclaimer, the term of this patent is extended or adjusted under 35 U.S.C. 154(b) by 1325 days.

(21) Appl. No.: 16/818,602

(22) Filed: Mar. 13, 2020

(65) Prior Publication Data

US 2020/0208470 A1 Jul. 2, 2020

Related U.S. Application Data

(63) Continuation of application No. 15/803,023, filed on Nov. 3, 2017, now Pat. No. 10,590,703, which is a (Continued)

(51) Int. Cl.

*E06C 7/48* (2006.01)
*E06C 1/04* (2006.01)

(Continued)

(52) U.S. Cl.

CPC ................ *E06C 7/482* (2013.01); *E06C 1/04* (2013.01); *E06C 1/14* (2013.01); *E06C 1/18* (2013.01); *E06C 7/14* (2013.01)

(58) Field of Classification Search

CPC .................................. E06C 7/482; E06C 1/04

See application file for complete search history.

(56) References Cited

U.S. PATENT DOCUMENTS 1,553,279 A * 9/1925 Wirth ...................... E06C 7/482 182/123
1,994,369 A * 3/1935 Risser ...................... E06C 7/48 182/206

(Continued)

FOREIGN PATENT DOCUMENTS

CA 2949807 5/2017
CA 183088 5/2019

(Continued)

OTHER PUBLICATIONS

Werner Co., "Werner #1 in Ladders, Climbing Equipment," Werner Catalog 2015, p. 41, 42, back page.

(Continued)

*Primary Examiner* — Brian D Mattei
*Assistant Examiner* — Kathleen M. McFarland
(74) *Attorney, Agent, or Firm* — Fitch, Even, Tabin & Flannery LLP

(57) ABSTRACT

A ladder having a first rail. The ladder having a second rail. The ladder having a plastic top directly attached to the first rail and second rail with fasteners. The top having a first side and a second side. The first side having a gap with a surface with a first rectangular slot and a second rectangular slot extending from the first rectangular slot so an external corner can fit into the first rectangular slot when the top leans against the corner. The surface of the first side having a first notch in the gap so a first rectangular plank can fit into the first notch when the top leans against the plank. The first notch having a width slightly larger than a width of the first plank. A ladder top. A method for using a ladder.

17 Claims, 20 Drawing Sheets

Related U.S. Application Data continuation-in-part of application No. 15/395,397, filed on Dec. 30, 2016, now Pat. No. 10,612,305, and a continuation-in-part of application No. 29/589,376, filed on Dec. 30, 2016, now Pat. No. Des. 835,807.

(60) Provisional application No. 62/520,935, filed on Jun. 16, 2017.

(51) Int. Cl.
*E06C 1/14* (2006.01)
*E06C 1/18* (2006.01)
*E06C 7/14* (2006.01)

(56) References Cited

U.S. PATENT DOCUMENTS

| | | | | | |
|---|---|---|---|---|---|
| 2,808,975 | A | * | 10/1957 | Roland | E06C 7/482 182/120 |
| 2,870,948 | A | * | 1/1959 | Lundgren | E06C 7/48 182/214 |
| 3,062,319 | A | * | 11/1962 | Wright | E06C 7/48 182/108 |
| 3,715,012 | A | * | 2/1973 | Perry | E06C 7/48 182/214 |
| 4,139,664 | A | * | 2/1979 | Wenrick | B29C 65/606 428/156 |
| 4,363,378 | A | * | 12/1982 | Williams | E06C 7/48 182/206 |
| 4,899,970 | A | * | 2/1990 | Berzina | E06C 7/14 248/210 |
| 5,259,480 | A | * | 11/1993 | Bartnicki | E06C 7/14 182/129 |
| 5,267,632 | A | * | 12/1993 | Mintz | A01M 31/02 182/163 |
| 5,358,070 | A | | 10/1994 | Bartnicki | |
| 5,460,241 | A | * | 10/1995 | LaBelle | E06C 7/16 182/121 |
| 5,573,081 | A | * | 11/1996 | Bartnicki | E06C 7/14 182/129 |
| 5,622,238 | A | * | 4/1997 | Farmer | E06C 1/34 182/214 |
| 5,810,406 | A | * | 9/1998 | Reid, Jr. | B29C 48/07 52/716.5 |
| 5,850,894 | A | * | 12/1998 | Busenhart | E06C 7/48 182/214 |
| D404,503 | S | * | 1/1999 | Bell | D25/68 |
| D413,990 | S | | 9/1999 | Bartnicki | |
| D422,717 | S | * | 4/2000 | Bartnicki | D25/68 |
| D447,818 | S | * | 9/2001 | Weber | D25/68 |
| 6,443,260 | B1 | * | 9/2002 | Katz | E06C 7/14 248/238 |
| 6,443,261 | B1 | * | 9/2002 | Gibson | E06C 7/14 182/104 |
| 6,536,557 | B2 | * | 3/2003 | Gibson | E06C 1/393 182/161 |
| 6,691,825 | B2 | * | 2/2004 | Haig | E06C 7/482 248/238 |
| 6,729,441 | B1 | * | 5/2004 | Nahlen | E06C 1/34 182/206 |
| 6,823,998 | B2 | * | 11/2004 | Fabregas | B25H 3/06 211/70.6 |
| D530,025 | S | * | 10/2006 | Patton | D25/68 |
| D531,322 | S | | 10/2006 | Patton | |
| 7,159,694 | B2 | * | 1/2007 | Gibson | E06C 1/393 182/161 |
| D548,364 | S | * | 8/2007 | Skubic | D25/64 |
| D548,855 | S | | 8/2007 | Meyers | |
| D549,356 | S | * | 8/2007 | Gibson | D25/68 |
| 7,264,084 | B1 | * | 9/2007 | Switzer | E06C 7/14 248/238 |
| D564,677 | S | * | 3/2008 | Farber | D25/68 |
| D597,685 | S | * | 8/2009 | Gibson | E06C 7/14 D25/68 |
| 7,575,097 | B2 | * | 8/2009 | Sheridan | E06C 1/34 182/206 |
| 7,753,170 | B1 | * | 7/2010 | Gibson | E06C 7/482 248/210 |
| D627,487 | S | * | 11/2010 | Lopez | D25/68 |
| 7,984,790 | B2 | * | 7/2011 | Meyers | E06C 1/393 182/163 |
| 8,011,476 | B1 | * | 9/2011 | Alcon | E06C 7/16 182/116 |
| 8,186,481 | B2 | * | 5/2012 | Moss | E06C 7/16 182/25 |
| 8,210,313 | B2 | * | 7/2012 | Astor | E06C 7/14 182/129 |
| 8,272,478 | B2 | * | 9/2012 | Astor | E06C 7/14 248/238 |
| 8,376,085 | B2 | * | 2/2013 | Astor | E06C 7/14 248/238 |
| 8,596,454 | B1 | * | 12/2013 | Carlson | B25H 3/06 248/210 |
| 8,997,932 | B1 | * | 4/2015 | Ochoa | E06C 7/48 182/116 |
| 9,359,819 | B1 | * | 6/2016 | Valadez | E06C 7/14 |
| D766,461 | S | * | 9/2016 | Moss | D25/64 |
| D766,462 | S | * | 9/2016 | Moss | D25/64 |
| 9,435,155 | B2 | * | 9/2016 | Tiber | E06C 7/46 |
| D777,350 | S | * | 1/2017 | Moss | D25/64 |
| 9,714,541 | B2 | * | 7/2017 | Astor | E06C 7/14 |
| 9,714,542 | B1 | * | 7/2017 | Harcz | E06C 7/14 |
| 10,030,448 | B2 | * | 7/2018 | Miller | E06C 7/482 |
| 10,087,682 | B2 | | 10/2018 | Pfeifer | |
| 10,138,680 | B2 | | 11/2018 | Williams | |
| D835,807 | S | * | 12/2018 | Lentine | D25/69 |
| 10,294,721 | B1 | * | 5/2019 | Jafarmadar | E06C 1/06 |
| 10,435,947 | B2 | * | 10/2019 | Parker | E06C 1/383 |
| 10,458,183 | B2 | * | 10/2019 | Tiber | B26D 7/01 |
| 10,550,639 | B2 | * | 2/2020 | Tamez Reyes | E06C 7/50 |
| 10,590,703 | B2 | * | 3/2020 | Parker | E06C 1/18 |
| 10,597,941 | B2 | * | 3/2020 | Moss | E06C 1/16 |
| 10,612,305 | B2 | | 4/2020 | Mora | |
| 10,662,706 | B2 | * | 5/2020 | Heffernan | E04G 5/003 |
| D887,581 | S | | 6/2020 | Dangrow | |
| 10,781,636 | B2 | * | 9/2020 | Astor | E06C 7/14 |
| D899,628 | S | * | 10/2020 | Moncada | D25/64 |
| D905,869 | S | * | 12/2020 | Lentine | D25/68 |
| D935,053 | S | | 11/2021 | Lentine | |
| 11,187,039 | B2 | * | 11/2021 | Moreno Moncada | E06C 7/46 |
| 2002/0108811 | A1 | * | 8/2002 | Ulmschneider | E06C 7/482 182/206 |
| 2007/0181366 | A1 | * | 8/2007 | Astor | E06C 7/14 182/129 |
| 2007/0181367 | A1 | * | 8/2007 | Astor | E06C 7/14 182/129 |
| 2008/0017447 | A1 | * | 1/2008 | Sheridan | E06C 1/34 182/107 |
| 2008/0083583 | A1 | * | 4/2008 | Gibson | E06C 7/14 182/108 |
| 2009/0028336 | A1 | * | 1/2009 | Goodman | G06F 21/6218 380/277 |
| 2009/0283361 | A1 | * | 11/2009 | Gibson | E06C 7/14 182/230 |
| 2010/0200331 | A1 | * | 8/2010 | Hager | E06C 1/06 182/129 |
| 2012/0024630 | A1 | * | 2/2012 | VanLaningham | A01M 31/02 182/116 |
| 2012/0097481 | A1 | * | 4/2012 | Schienke | E06C 1/06 182/107 |
| 2012/0217093 | A1 | | 8/2012 | Latimer | |
| 2013/0112502 | A1 | * | 5/2013 | Oliver | E06C 7/14 220/628 |
| 2013/0327593 | A1 | * | 12/2013 | Perkins | E06C 1/14 182/180.1 |
| 2013/0327907 | A1 | * | 12/2013 | Reitz | F16M 13/025 248/210 |
| 2014/0332316 | A1 | * | 11/2014 | Tiber | E06C 7/46 83/13 |

(56) References Cited

U.S. PATENT DOCUMENTS

| | | | | |
|---|---|---|---|---|
| 2015/0090533 | A1* | 4/2015 | Moss | E06C 7/14 182/180.1 |
| 2016/0348434 | A1* | 12/2016 | Williams | E06C 7/14 |
| 2017/0089135 | A1* | 3/2017 | Heffernan | E04G 5/003 |
| 2017/0130529 | A1* | 5/2017 | Tamez Reyes | E06C 7/50 |
| 2017/0152710 | A1* | 6/2017 | Miller | E06C 7/482 |
| 2017/0234069 | A1* | 8/2017 | Pfeifer | E06C 7/182 248/238 |
| 2018/0163471 | A1 | 6/2018 | Lentine | |
| 2018/0187488 | A1* | 7/2018 | Mora | E06C 1/18 |
| 2018/0187489 | A1* | 7/2018 | Parker | E06C 1/14 |
| 2018/0258698 | A1* | 9/2018 | Minock | E06C 7/482 |
| 2020/0056427 | A1* | 2/2020 | Tiber | E06C 7/14 |
| 2020/0208470 | A1* | 7/2020 | Parker | E06C 1/18 |
| 2020/0232280 | A1 | 7/2020 | Mora | |
| 2020/0270945 | A1* | 8/2020 | Tamez Reyes | E06C 1/12 |

FOREIGN PATENT DOCUMENTS

| | | | | |
|---|---|---|---|---|
| GB | 2207453 | | 2/1989 | |
| GB | 2207453 A | * | 2/1989 | E06C 7/48 |
| GB | 2297350 A | | 7/1996 | |

OTHER PUBLICATIONS

Ladder Black Top Cap, Date first available on Aug. 24, 2023, Retrieved from internet [Oct. 4, 2024] URL: https://www.amazon.com/ Louisville-Ladder-Black-FS 1400-PK727 /dp/BOCGKVB6Y8 (Year: 2023).

* cited by examiner

LADDER AND LADDER TOP

CROSS-REFERENCE TO RELATED APPLICATIONS

This is a continuation of U.S. patent application Ser. No. 15/803,023 filed Nov. 3, 2017, now U.S. Pat. No. 10,590,703, which is a nonprovisional application of U.S. provisional application Ser. No. 62/520,935 filed Jun. 16, 2017, and is a continuation-in-part of U.S. patent application Ser. No. 15/395,397 filed Dec. 30, 2016 and U.S. design patent application Ser. No. 29/589,376 filed Dec. 30, 2016, now U.S. Pat. No. D835,807 issued Dec. 11, 2018, all of which are incorporated by reference herein.

FIELD OF THE INVENTION

The present invention is related to a top of a ladder that can stably lean against an external corner or a rectangular plank whose width is less than the width of the top. (As used herein, references to the "present invention" or "invention" relate to exemplary embodiments and not necessarily to every embodiment encompassed by the appended claims.) More specifically, the present invention is related to a top of a ladder that can stably lean against an external corner or a rectangular plank whose width is less than the width of the top where the top has a first side with a surface and a gap, and the surface in the gap has a V or an upside down bottle top shape to conform to the corner when the top leans against a corner, and the surface in the gap has a notch to conform to the rectangular plank when the top leans against the rectangular plank.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Ladders are commonly used to lean against surfaces that are wider than the width of a ladder top, or against corners. However, there are other surfaces, such as rectangular planks whose width is less than the width of a ladder top. It is desirable to be able to stably lean a ladder top against rectangular planks whose width is less than the width of the ladder top as well as external and internal corners.

BRIEF SUMMARY OF THE INVENTION

The present invention pertains to a ladder. The ladder comprises a first rail. The ladder comprises a second rail. The ladder comprises a plastic top directly attached to the first rail and second rail with fasteners. The top having a first side and a second side. The first side having a gap with a surface with a V so a corner can fit into the V when the top leans against the corner. The surface of the first side having a first notch in the gap so a first rectangular plank can fit into the first notch when the top leans against the plank. The first notch having a width slightly larger than a width of the first plank. The top having a first cushion bonded to the first side without any mechanical fasteners.

The present invention pertains to a top for a ladder to be leaned against a first rectangular plank or an external corner. The top has a first rail and a second rail. The top comprises a middle portion having a perimeter with a first side, second side, third side and fourth side extending down from the perimeter. The first side has a gap with a surface with a V so a corner can fit into the V when the top leans against the corner. The surface of the first side having a first notch in the gap so a first rectangular plank can fit into the first notch when the top leans against the plank. The first notch has a width slightly larger than a width of the first plank. The top being one piece and made of plastic. The third side having a first fastener hole to receive a first fastener to permanently attach the first rail to the third side. The fourth side has a second fastener hole to receive a second fastener to permanently attach the second rail to the fourth side.

The present invention pertains to a method for using a ladder. The method comprises the steps of moving the ladder to a first rectangular plank. There is the step of leaning the ladder against the first rectangular plank so the rectangular plank is disposed in a first notch in a gap in a first side of a plastic top directly attached to a first rail and a second rail with fasteners. The top has a second side. The first side has the gap which has a surface with a V so a corner can fit into the V when the top leans against the corner. The surface of the first side having the first notch in the gap. The first notch having a width slightly larger than a width of the first plank.

The present invention pertains to a ladder. The ladder comprises a first rail. The ladder comprises a second rail. The ladder comprises a plastic top directly attached to the first rail and second rail with fasteners. The top having a first side and a second side. The first side having a gap with a surface with a first rectangular slot and a second rectangular slot extending from the first rectangular slot so an external corner can fit into the first and second rectangular slots when the top leans against the corner. The surface of the first side having a first notch in the gap so a first rectangular plank can fit into the first notch when the top leans against the plank. The first notch having a width slightly larger than a width of the first plank. The top having a first cushion bonded to the first side without any mechanical fasteners.

The present invention pertains to a top for a ladder to be leaned against a first rectangular plank or an external corner. The top is directly attached to a first rail and a second rail. The top comprises a middle portion having a perimeter with a first side, second side, third side and fourth side extending down from the perimeter. The first side has a gap with a surface with a first rectangular slot and a second rectangular slot extending from the first rectangular slot so an external corner can fit into the first and second rectangular slots when the top leans against the corner. The surface of the first side having a first notch in the gap so a first rectangular plank can fit into the first notch when the top leans against the plank. The first notch has a width slightly larger than a width of the first plank. The top being one piece and made of plastic. The third side having a first fastener hole to receive a first fastener to permanently attach the first rail to the third side. The fourth side has a second fastener hole to receive a second fastener to permanently attach the second rail to the fourth side.

The present invention pertains to a method for using a ladder. The method comprises the steps of moving the ladder to a first rectangular plank. There is the step of leaning the ladder against the first rectangular plank so the rectangular plank is disposed in a first notch in a gap in a first side of a plastic top directly attached to a first rail and a second rail with fasteners. The top has a second side. The first side has the gap which has a surface with a first rectangular slot and a second rectangular slot extending from the first rectangular slot so an external corner, as shown in FIG. 29, can fit into the first and second rectangular slots when the top leans against the corner. The surface of the first side having the first notch in the gap. The first notch having a width slightly larger than a width of the first plank.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 5:
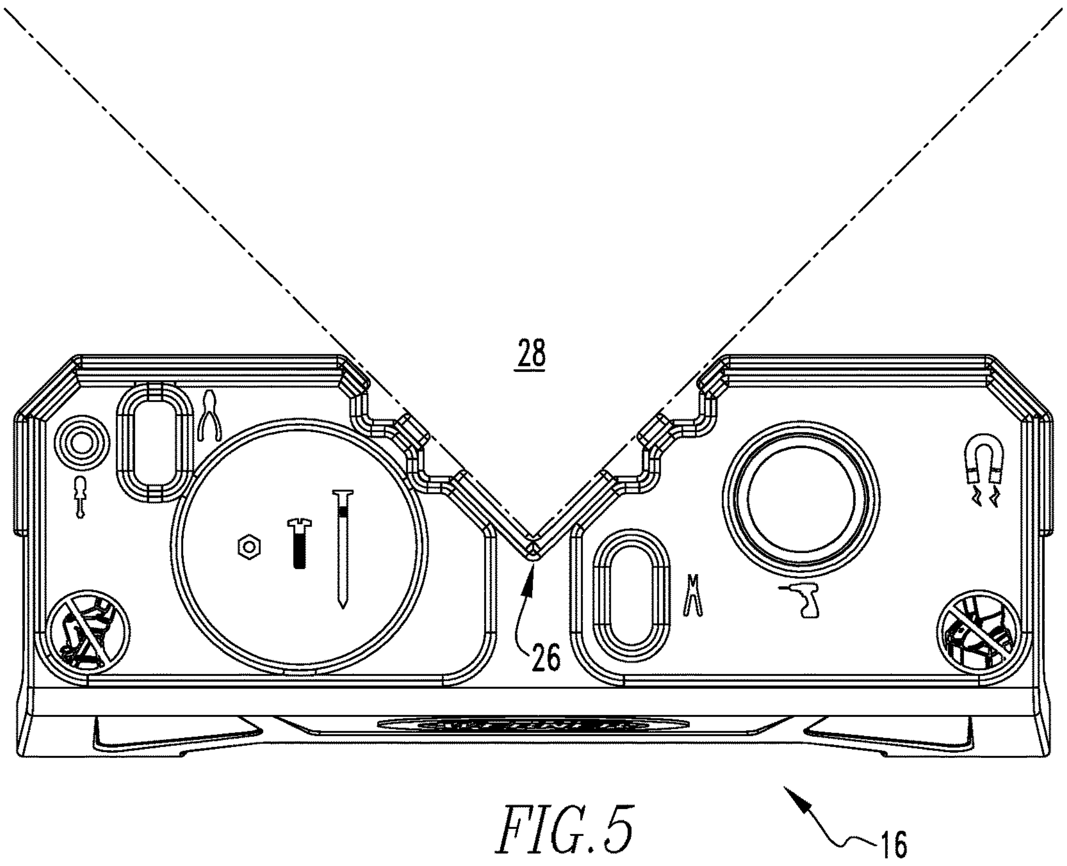
FIG. 5 shows an overhead view of the ladder top against an external corner.
Figure 6:
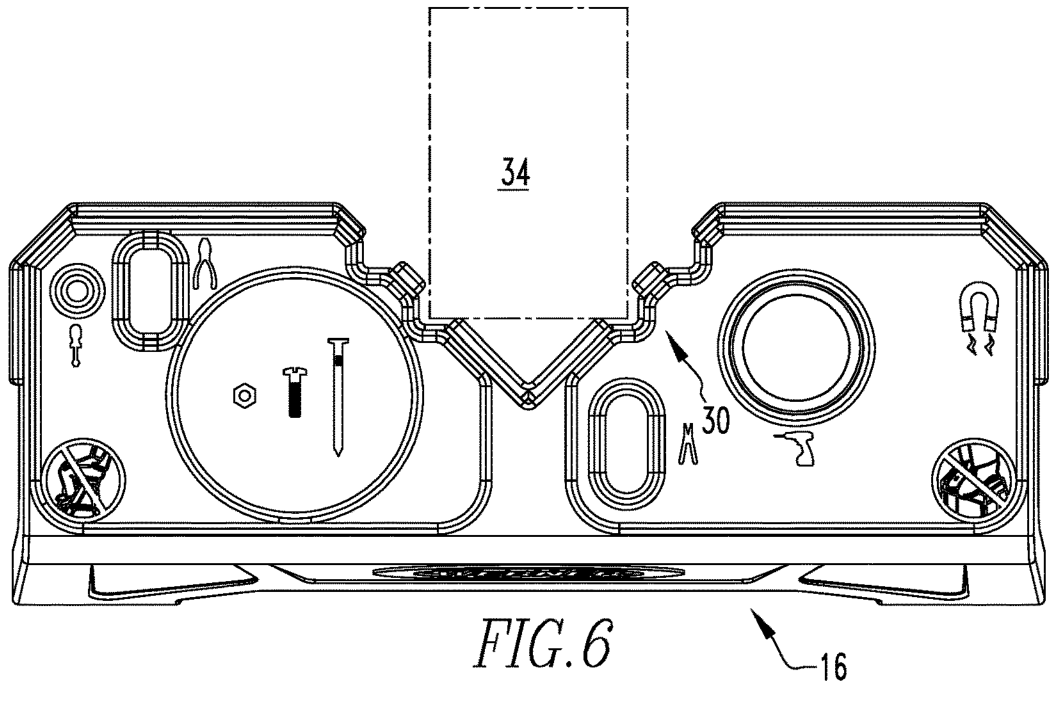
FIG. 6 shows an overhead view of the ladder top against a first rectangular plank.
Figure 14:
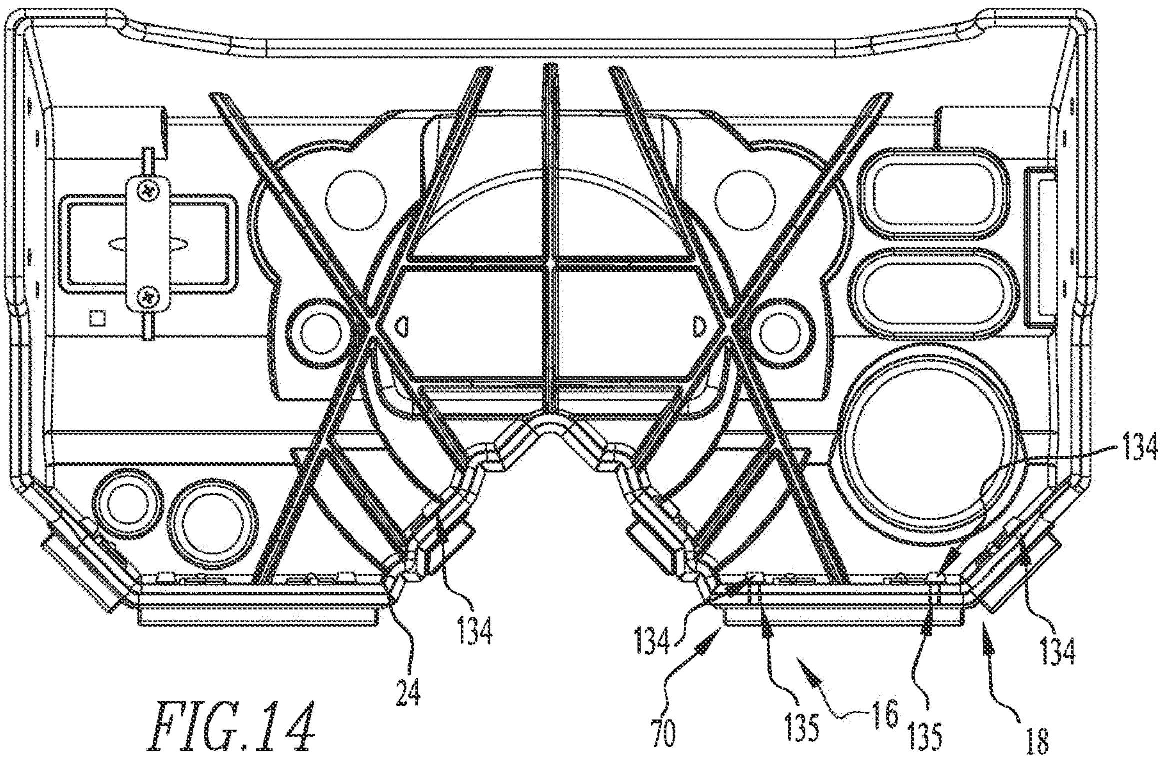
FIG. 14 is a bottom view of the alternative embodiment of the ladder top.

Referring now to the drawings wherein like reference numerals refer to similar or identical parts throughout the several views, and more specifically to FIGS. 1-4 and 10, thereof, there is shown a ladder 10. The ladder 10 comprises a first rail 12. The ladder 10 comprises a second rail 14. The ladder 10 comprises a plastic top 16 directly attached to the first rail 12 and second rail 14 with fasteners 78. The top 16 has a first side 18 and a second side 20. The first side 18 has a gap 22 with a surface 24 with a V 26 so an external corner 28, as shown in FIG. 5, can fit into the V 26 when the top 16 leans against the corner 28. The surface 24 of the first side 18 has a first notch 30 in the gap 22 so a first rectangular plank 34 can fit into the first notch 30 when the top 16 leans against the plank, as shown in FIG. 6. The first notch 30 has a width slightly larger than a width of the first plank 34. The top 16 having a first cushion 70 bonded to the first side without any mechanical fasteners. As shown in FIG. 14, the cushion 70 may be connected via barbs or protrusions 134 extending through cavities or openings 135.

Figure 7:
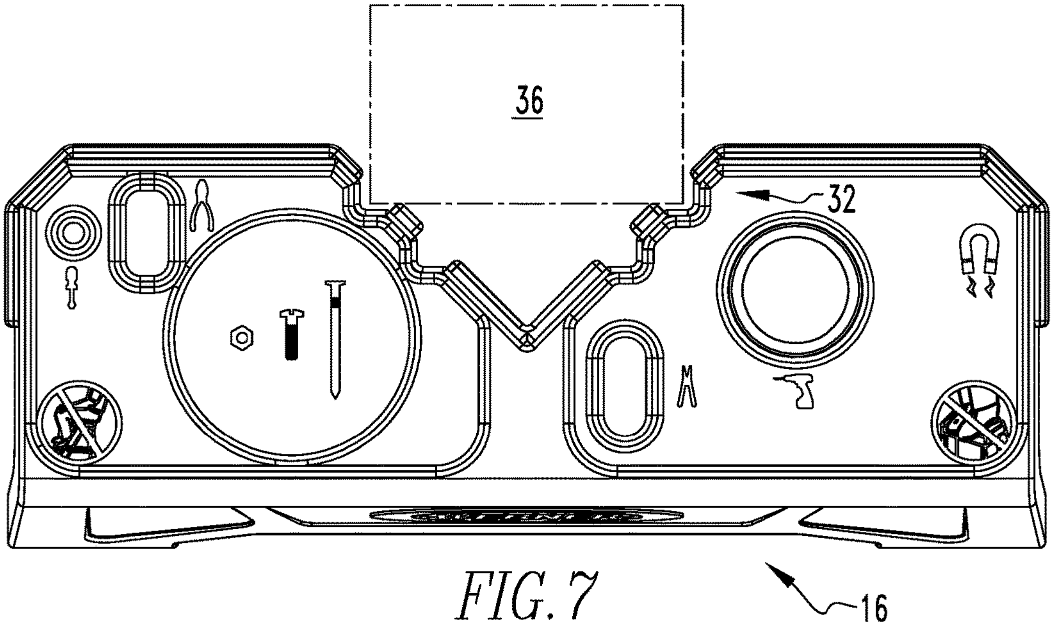
FIG. 7 shows an overhead view of the ladder top against a second rectangular plank.

The first notch 30 may be in the V 26. The surface 24 of the first side 18 may have a second notch 32 in the gap 22 having a width greater than the width of the first notch 30 so a second rectangular plank 36 having a width slightly smaller than the width of the second notch 32 can fit into the second notch 32 when the top 16 leans against the second plank 36, as shown in FIG. 7. The second notch 32 may be in the V 26.

Figure 1:
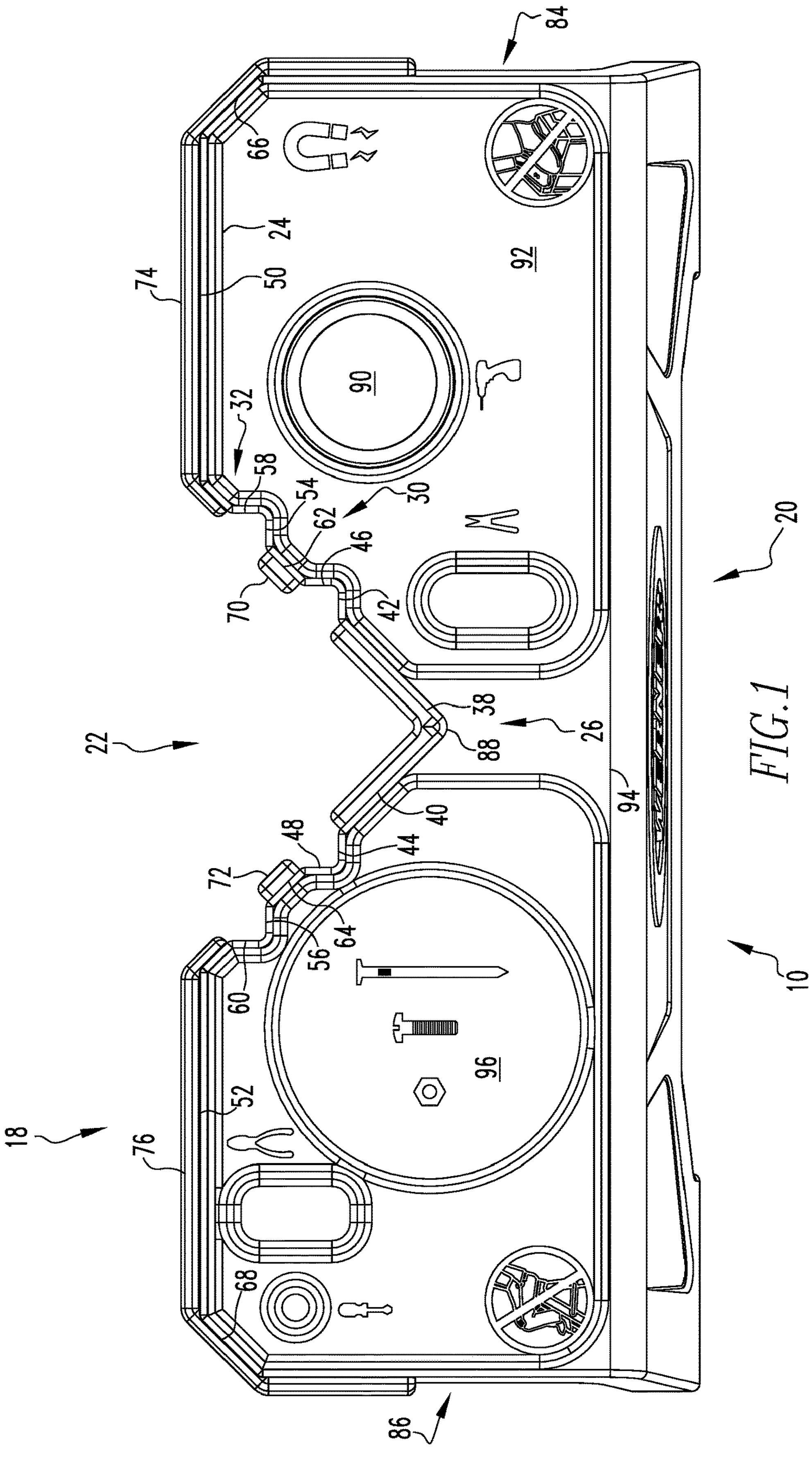
FIG. 1 shows an overhead view of a ladder top of the present invention.

The surface 24 of the first side 18 may have a first straight segment 38, a second straight segment 40, a third straight segment 42, a fourth straight segment 44, a fifth straight segment 46, a sixth straight segment 48, a seventh straight segment 50 and an eighth straight segment 52, as shown in FIG. 1. The second straight segment 40 may directly connect with the first straight segment 38 to form a bottom 88 of the V 26. The third straight segment 42 may directly connect with the first straight segment 38 at an angle greater than 100° and less than 170°. The fourth straight segment 44 may directly connect with the second straight segment 40 at an angle greater than 100° and less than 170°. The fifth straight segment 46 may directly connect with the third straight segment 42 at an angle of about 90°. The sixth straight segment 48 may directly connect with the fourth straight segment 44 at an angle of about 90°. The third, fourth, fifth and sixth straight segments 42, 44, 46, 48 together forming the first notch 30.

The surface 24 of the first side 18 may have a ninth straight segment 54, a tenth straight segment 56, an eleventh straight segment 58 and a twelfth straight segment 60. The eleventh straight segment 58 may directly connect with the ninth straight segment 54 at an angle of about 90°. The twelfth straight segment 60 may directly connect with the tenth straight segment 56 at an angle of about 90°. The ninth, tenth, eleventh and twelfth straight segments 54, 56, 58, 60 together forming the second notch 32 in the gap 22 having a width greater than the width of the first notch 30 so the second rectangular plank 36 having a width slightly smaller than the width of the second notch 32 can fit into the second notch 32 when the top 16 leans against the second plank 36.

The surface 24 of the first side 18 may have a thirteenth straight segment 62 and a fourteenth straight segment 64. The thirteenth straight segment 62 may directly connect with the fifth straight segment 46 and the ninth straight segment 54 and is in linear alignment with the first straight segment 38. The fourteenth straight segment 64 may directly connect with the sixth straight segment 48 and the tenth straight segment 56 and is in linear alignment with the second straight segment 40.

The first cushion 70 may be attached to the surface 24 of the first side 18 in the gap 22 at the thirteenth straight segment 62 and a second cushion 72 attached to the surface 24 of the first side 18 in the gap 22 at the fourteenth straight segment 64. The first and second cushions 70, 72 protect the corner 28 from being scratched or marred by the top 16 when the top 16 leans against the corner 28. The top 16 may have a third side 84 directly connected to the first side 18 and the second side 20 and a fourth side 86 directly connected to the first side 18 and the second side 20. The first rail 12 may be permanently attached with a first fastener 80 to the third side 84 and the second rail 14 maybe permanently attached with a second fastener 82. The ladder 10 may include a third cushion 74 attached to the surface 24 of the first side 18 at the seventh straight segment 50 and a fourth cushion 76 attached to the surface 24 of the first side 18 at the eighth straight segment 52.

The top 16 may have a middle portion 92 disposed between a perimeter 94 of the top 16 defined by the first, second, third and fourth sides 18, 20, 84, 86. The middle portion 92 may have a paint can indentation 96 to hold a paint can, and a tool hole 90 to hold a tool, such as a screwdriver or pliers or drill. There may be several tool holes 90 in the middle portion 92 to accommodate a number of different types of tools.

Figure 8:
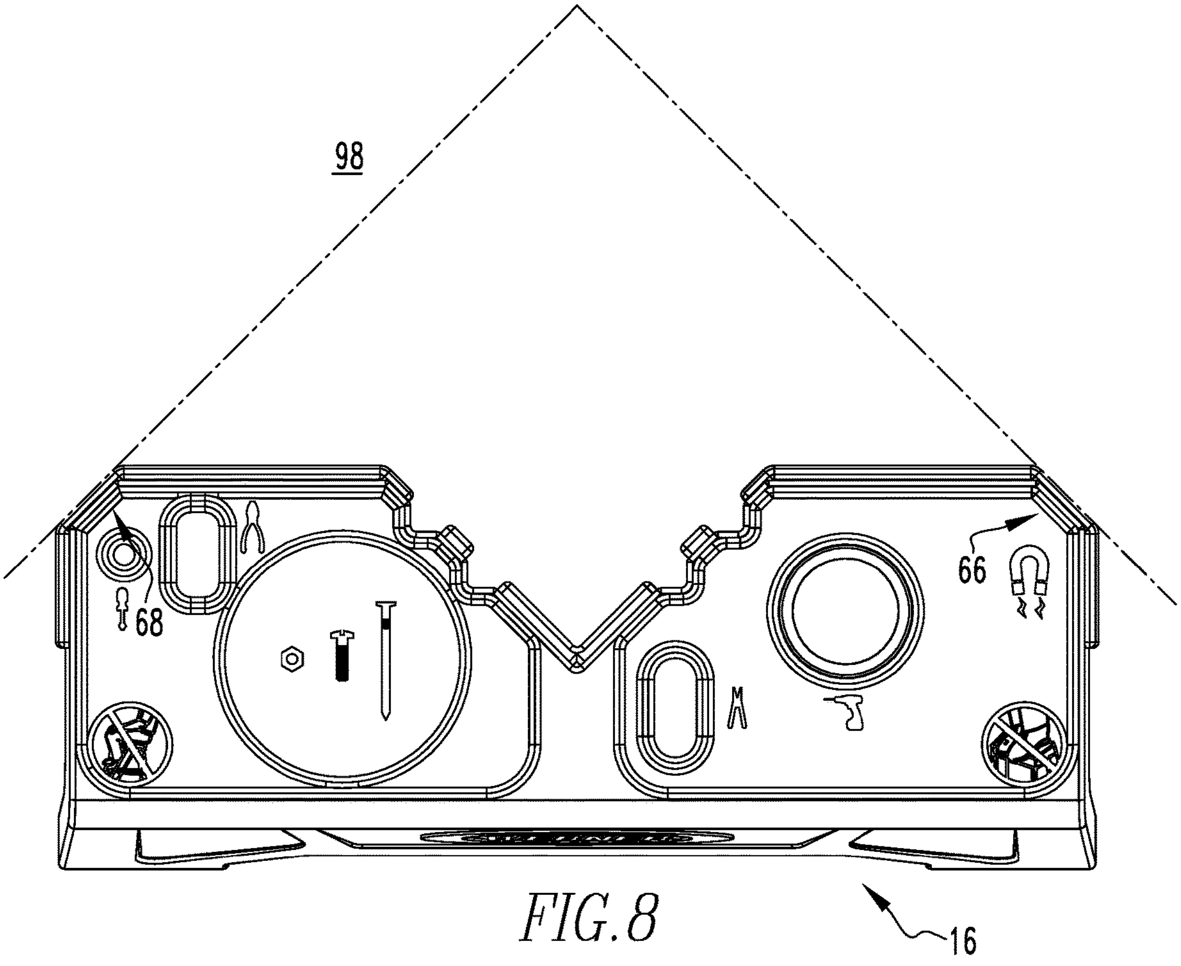
FIG. 8 is an overhead view of the ladder top against an internal corner.
Figure 9:
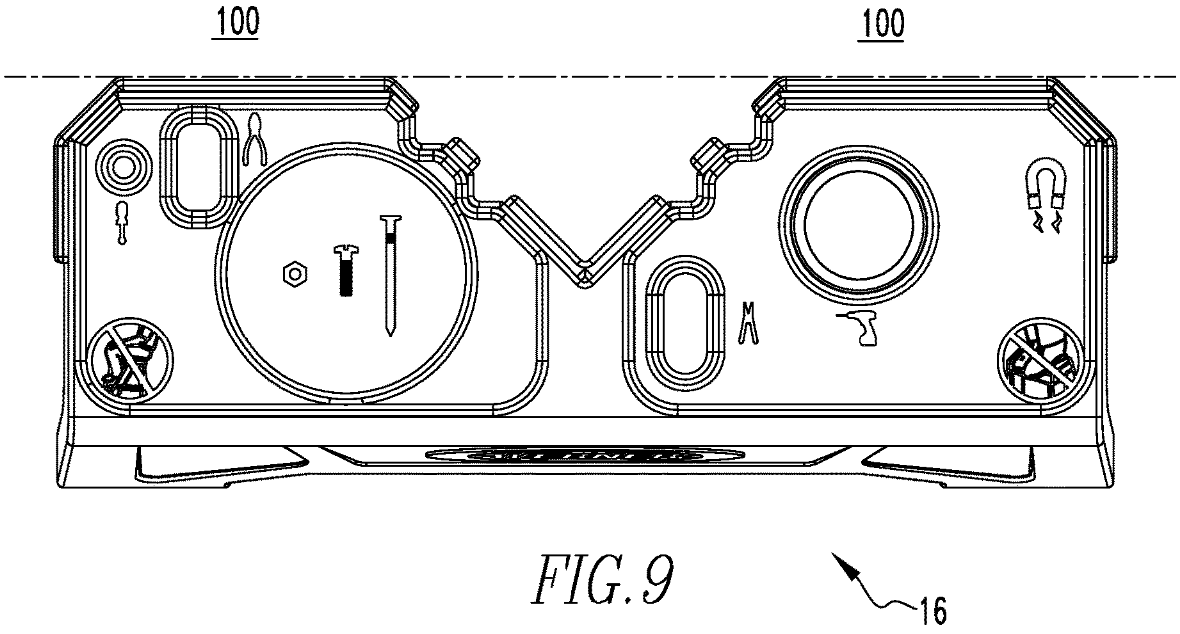
FIG. 9 is an overhead view of the ladder top against a wall.

The surface 24 of the first side 18 may have a fifteenth straight segment 66 that directly connects with the third side 84 and to the seventh straight segment 50 at an angle between 20° and 70°, and a sixteenth straight segment 68 that directly connects with the fourth side 86 and the eighth straight segment 52 at an angle between 20° and 70°. As shown in FIG. 8, the angular position of the seventh and eighth straight segments allow the seventh and eighth straight segments, and thus the top 16, to fit stably against an internal corner 98 when the top 16 leans against an internal corner 98. Additional cushions may be used as desired along the first side 18. When leaning against a wide surface, such as a wall 100 as shown in FIG. 9, the third cushion on the seventh straight segment and the fourth cushion on the eighth straight segment of the top 16 will rest against the wall 100.

The present invention pertains to a top 16 for a ladder 10 to be leaned against a first rectangular plank 34 or an external corner 28. The top has a first rail and a second rail attached to it. The top comprises a middle portion 92 having a perimeter 94 with a first side 18, second side 20, third side 84 and fourth side 86 extending down from the perimeter 94. The first side 18 has a gap 22 with a surface 24 with a V 26 so a corner 28 can fit into the V 26 when the top 16 leans against the corner 28. The surface 24 of the first side 18 having a first notch 30 in the gap 22 so a first rectangular plank 34 can fit into the first notch 30 when the top 16 leans against the plank 34. The first notch 30 has a width slightly larger than a width of the first plank 34. The top 16 being one piece and made of plastic and the cushions made of rubber. The third side 84 having a first fastener hole 102 to receive a first fastener 80 to permanently attach the first rail 12 to the third side 84. The fourth side 86 has a second fastener hole 104 to receive a second fastener 82 to permanently attach the second rail 14 to the fourth side 86.

The present invention pertains to a method for using a ladder 10. The method comprises the steps of moving the ladder 10 to a first rectangular plank 34. There is the step of leaning the ladder 10 against the first rectangular plank 34 so the rectangular plank 34 is disposed in a first notch 30 in a gap 22 in a first side 18 of a plastic top 16 directly attached to a first rail 12 and a second rail 14 with fasteners 78. The top 16 has a second side 20. The first side 18 has the gap 22 which has a surface 24 with a V 26 so a corner 28 can fit into the V 26 when the top 16 leans against the corner 28. The surface 24 of the first side 18 having the first notch 30 in the gap 22. The first notch 30 having a width slightly larger than a width of the first plank 34.

In the operation of the invention, in one embodiment, a molded top 16 fits on the upper rail ends of the fly section of an extension ladder 10. The top 16 has locations at its middle portion 92 to permit the temporary placement of tools when the user is working at the upper end of the ladder 10. The back or first side 18 of the top 16 is specifically designed so that the ladder 10 may be leaned against a wide flat surface, such as a wall 100 as shown in FIG. 9, may be leaned against an external corner 28 as shown in FIG. 5, and may be leaned against and closely engage a rectangular plank, such as 6" wide or 4" wide lumber as shown in FIGS. 6 and 7.

When leaning against an external corner 28, the V shape of the external corner 28 fits into the V 26 of the top 16 formed by the first straight segment 38 and the second straight segment 40. The first straight segment 38 directly connects with the second straight segment 40, typically at an angle of about 90°, to match a typical external corner 28. In addition, the external corner 28, when the top 16 is leaning against the corner 28 and the external corner 28 is in the gap 22, the external corner 28 also contacts the first cushion 70 on the thirteenth straight segment 62, which is in linear alignment with the first straight segment 38, and the second cushion 72 which is on the fourteenth straight segment 64 which is in linear alignment with the second straight segment 40. By being in linear alignment with the first and second straight segments 38, 40, the thirteenth straight segment 62 and the fourteenth straight segment 64, respectively, effectively extend the length of the V 26 to provide a larger V and thus a larger surface area for the top 16 to rest against and consequently a more secure and stable fit of the top 16 with the external corner 28.

Similarly, when the top 16 leans against an internal corner 98, the fifteenth straight segment 66 and the sixteenth straight segment 68, which directly connect to and form an angle of about 45° with the seventh straight segment 50 and the eighth straight segment 52, respectively, stably rest against and align with the walls that form the internal corner 98. In this way the top can be disposed in an internal corner for a user to use, with a greater surface area of the top 16 contacting the walls of the internal corner 98 than if the fifteenth and sixteenth straight segments did not exist or were not that about a 45° angle relative to the seventh and eighth straight segments.

The first notch 30 and the second notch 32 are disposed in, or integrated with and break up the V 26 in the gap 22. The first notch 30 conforms to the rectangular cross-section of a rectangular plank, such as a 4 inch wide plank. The first notch 30 is slightly larger in width than the width of the 4 inch plank so that when the top 16 leans against the 4 inch plank, the first notch 30 receives the 4 inch plank rather snuggly so there is essentially no movement between the top 16 and the 4 inch plank and the top 16 is stably positioned with the 4 inch plank.

Similarly, the second notch 32 conforms to the rectangular cross-section of a rectangular plan, such as a 6 inch wide plank. The second notch 32 is slightly larger in width than the width of the 6 inch plank so that when the top 16 leans against the 6 inch plank, the second notch 32 receives the 6 inch plank rather snuggly so there is essentially no movement between the top 16 and the 6 inch plank top 16 is stably positioned with the 6 inch plank.

Outside the gap 22 on either side of the top 16 there is a third cushion 74 and forth cushion which will contact a flat section, such as a wall, when the top 16 leans against the wall. The third and fourth cushions 74, 76 protect the wall from being marred or scratched by the top 16 when the top 16 leans against the wall.

The ladder top 16 with the cushions or pads is formed from 2 distinct materials. A mold utilizing a rotating platen to process two materials in the same part produces the ladder top 16 with the cushions. The ladder top 16 is made of polypropylene and the soft rubber pads or cushions are made of a ThermoPlastic Vulcanizate (TPV), specifically under the brand name Santoprene (TPV). In the production process, a mold for the top 16 receives the molten plastic. A removable portion of the mold creates cavities or openings 135 in the first side 18 where the cushions will ultimately be located. After the top 16 is formed, it stays in the stationary portion of the mold and the removable portion of the mold is replaced with a second removable portion of the mold. The overall mold is then closed and liquid TPV is introduced into the mold to fill the cavities that are then present in the preformed top 16. The TPV is allowed to cool resulting in the presence of the cushions with the top 16. These cushions form both mechanical and a chemical bond with the top 16, for added strength to prevent the cushions from separating from the first side 18. The molten TPV chemically reacts with the polypropylene to create the chemical bond, as well as with the cooling TPV forming a mechanical bond. The top 16 may be one continuous piece, including the cushions, given the cushions are chemically bonded to the segments.

The rails and the rungs themselves are standard commonly available components. The width of the top 16 is preferably between 13 and 20 inches. The length of the ladder top is between 5 and 10 inches. The height of the ladder top is between 2 and 7 inches. The thickness of the ladder top is between ⅛ of an inch and ⅜ of an inch. Buttressing (each rib being between 0.1 and 0.2 inches thick) underneath the top 16 can be utilized as shown in the figures. The ladder 10 with any of the embodiments described herein of the top 16 when leaning against a surface at 75.5° can support a load on the ladder of at least 600 pounds without failing.

Figure 26:
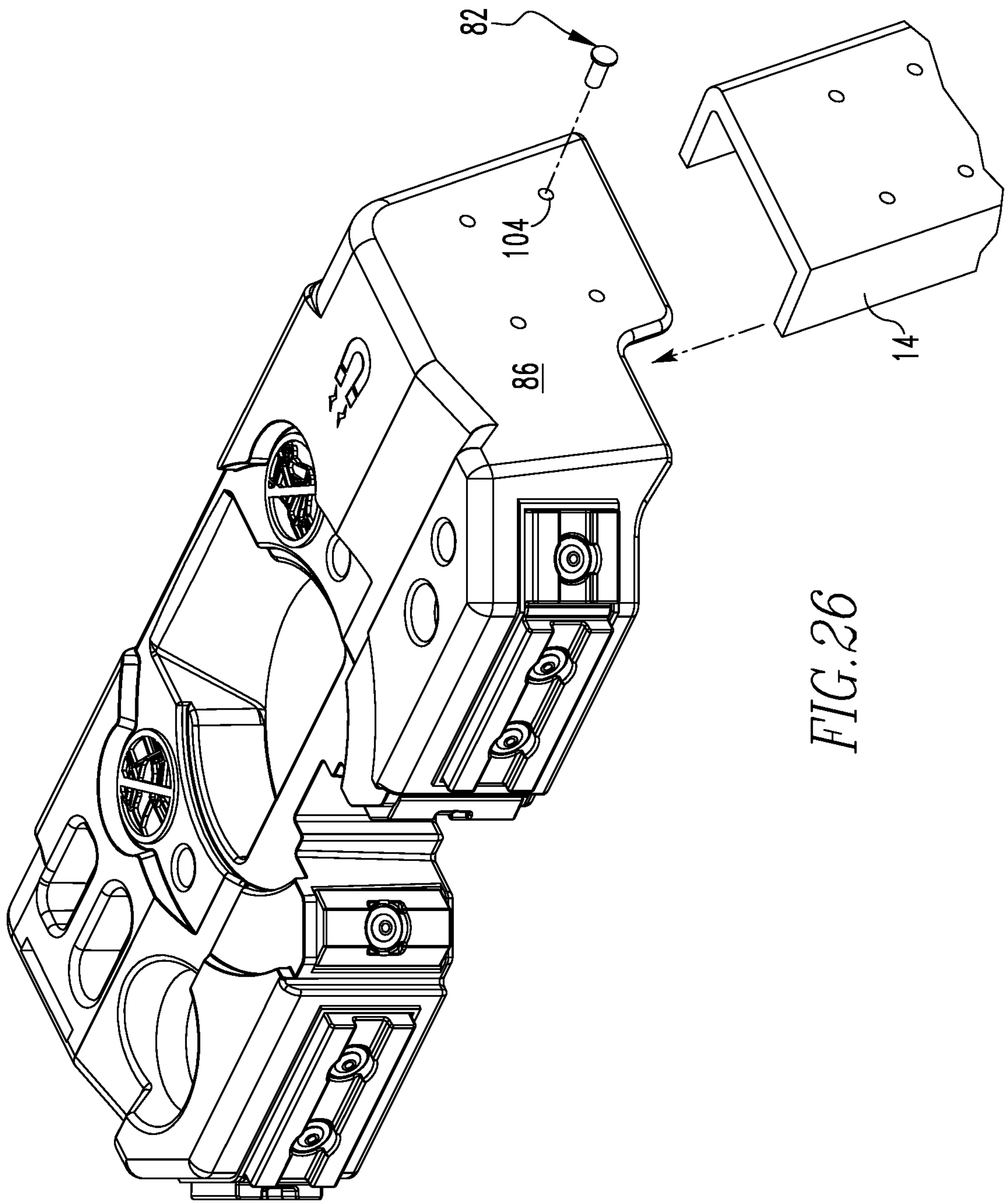
FIG. 26 is a front perspective view of the top of FIG. 23.
Figure 27:
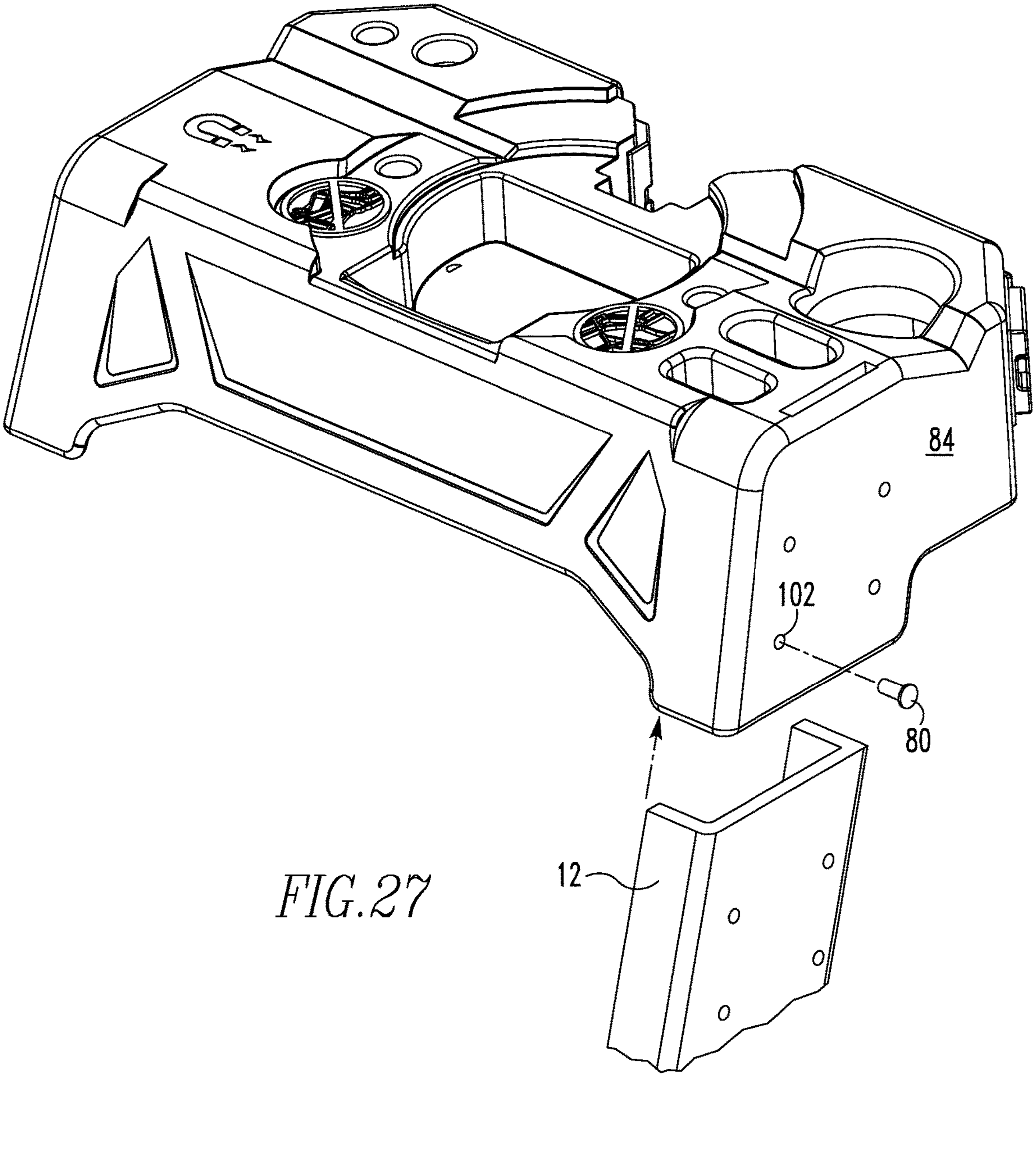
FIG. 27 is a rear perspective view of the top of FIG. 23.
Figure 28:
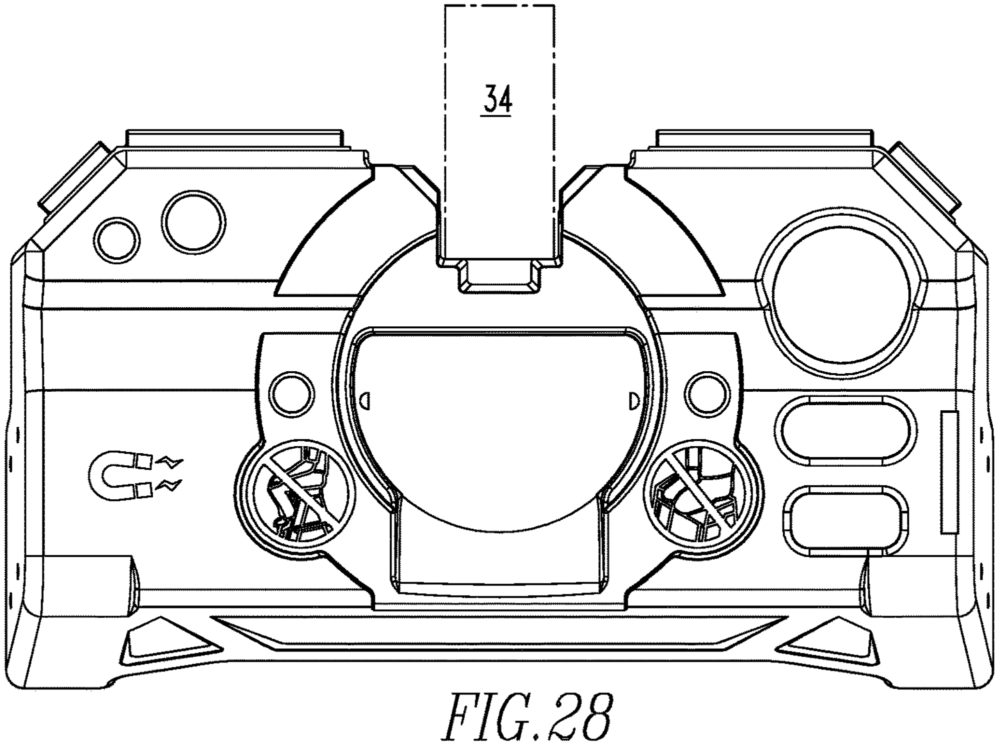
FIG. 28 shows the top of FIG. 23 with a 2×4 in the first notch.
Figure 29:
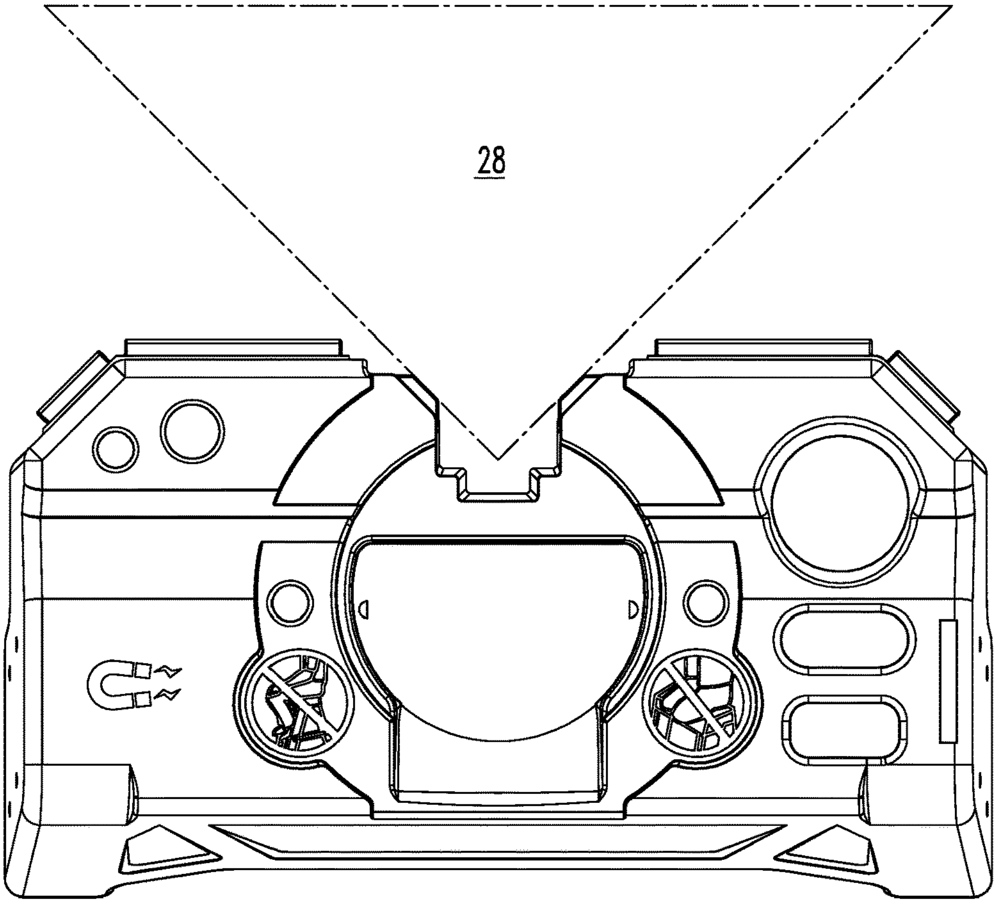
FIG. 29 shows the top of FIG. 23 with an external corner in the gap.

Referring to FIGS. 23-27 and 30, thereof, there is shown a ladder 10. The ladder 10 comprises a first rail 12. The ladder 10 comprises a second rail 14. The ladder 10 comprises a plastic top 16 directly attached to the first rail 12 and second rail 14 with fasteners 78. The top 16 has a first side 18 and a second side 20. The first side 18 has a gap 22 with a surface 24 with a first rectangular slot 27 and a second rectangular slot 29 extending from the first rectangular slot 27, essentially forming an upside down bottle top shape, so an external corner 28, as shown in FIG. 29 can fit into the first and second rectangular slots 27, 29 when the top 16 leans against the corner 28. The surface 24 of the first side 18 has a first notch 30 in the gap 22 formed from the first and second rectangular slots so a first rectangular plank 34 can fit into the first notch 30 when the top 16 leans against the plank 34, as shown in FIG. 28. The first notch 30 has a width slightly larger than a width of the first plank 34. The top 16 having a first cushion 70 bonded to the first side without any mechanical fasteners.

The surface 24 of the first side 18 may have a second notch 32 in the gap 22 having a width greater than the width of the first notch 30 so a second rectangular plank 36 having a width slightly smaller than the width of the second notch 32 can fit into the second notch 32 when the top 16 leans against the second plank 36, as shown in FIG. 7. The second notch 32 may be in the gap 22 disposed in front of the first notch 30.

Figure 23:
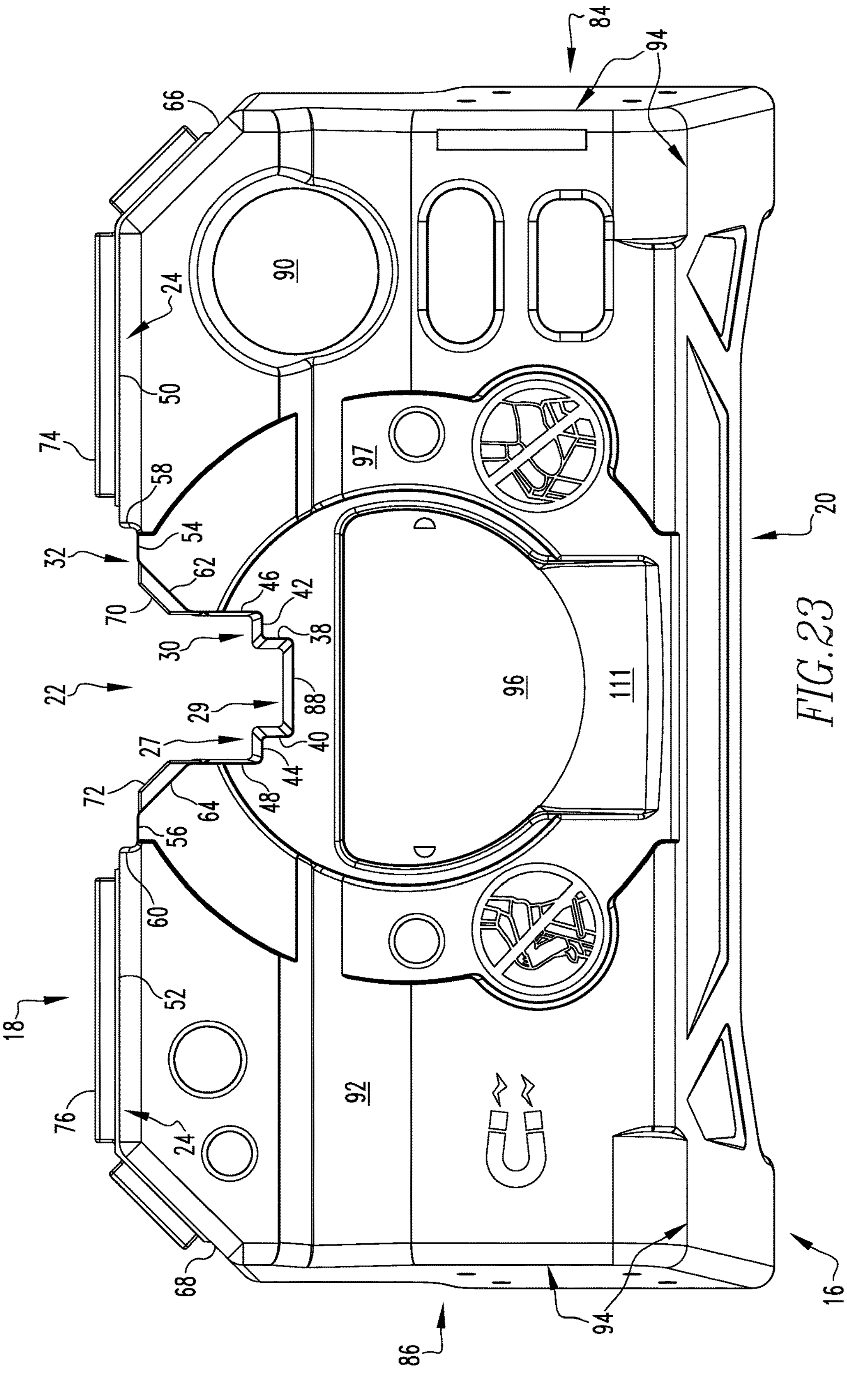
FIG. 23 is an overhead view of an alternative embodiment of a top.
Figure 24:
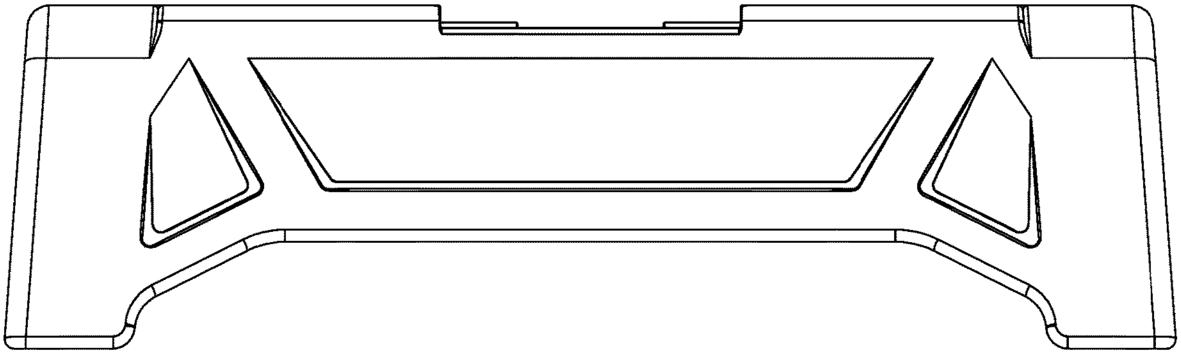
FIG. 24 is a rear view of the top of FIG. 23.
Figure 25:
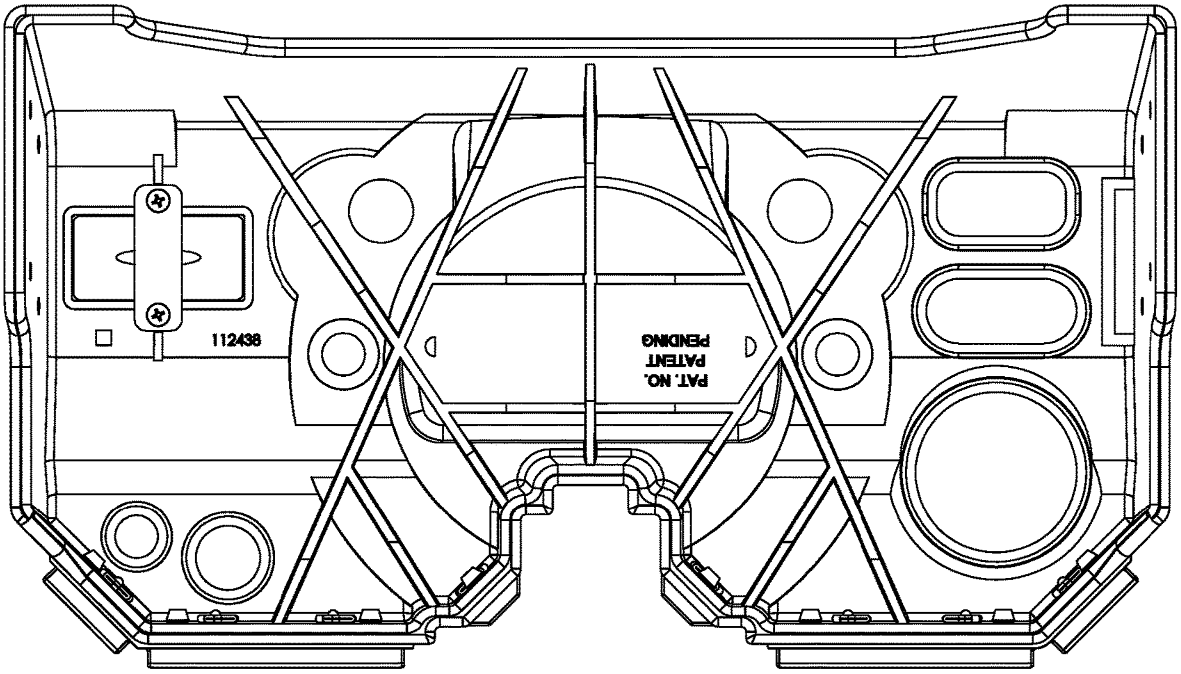
FIG. 25 is an underside view of the top of FIG. 23.

The surface 24 of the first side 18 may have a first straight segment 38, a second straight segment 40, a third straight segment 42, a fourth straight segment 44, a fifth straight segment 46, a sixth straight segment 48, a seventh straight segment 50 and an eighth straight segment 52 and a bottom straight segment 88. Segments 38, 40, 46, 48 are perpendicularly positioned relative to the second side 20. Segments 88, 42, 44, 50 and 52 are horizontally positioned relative to the second side 20, as shown in FIG. 23. The second straight segment 40 and the first straight segment 38 may directly connect with the bottom segment 88 of the gap 22. The third straight segment 42 may directly connect with the first straight segment 38 to form a right angle. The fourth straight segment 44 may directly connect with the second straight segment 40 and form a right angle. The fifth straight segment 46 may directly connect with the third straight segment 42 and form a right angle. The sixth straight segment 48 may directly connect with the fourth straight segment 44 and form a right angle. The third, fourth, fifth and sixth straight segments 42, 44, 46, 48 together forming the first notch 30.

The surface 24 of the first side 18 may have a ninth straight segment 54, a tenth straight segment 56, an eleventh straight segment 58 and a twelfth straight segment 60. The eleventh straight segment 58 may directly connect with the ninth straight segment 54 at an angle of about 90°. The twelfth straight segment 60 may directly connect with the tenth straight segment 56 at an angle of about 90°. The ninth, tenth, eleventh and twelfth straight segments 54, 56, 58, 60 together forming the second notch 32 in the gap 22 having a width greater than the width of the first notch 30 so the second rectangular plank 36 having a width slightly smaller than the width of the second notch 32 can fit into the second notch 32 when the top 16 leans against the second plank 36.

The surface 24 of the first side 18 may have a thirteenth straight segment 62 and a fourteenth straight segment 64. The thirteenth straight segment 62 may directly connect with the fifth straight segment 46 and connect with the ninth straight segment 54 at an angle of between 20° and 70° and preferably about 45°. The fourteenth straight segment 64 may directly connect with the sixth straight segment 48 and connect with the tenth straight segment 56 at an angle of between 20° and 70° and preferably about 45°. An external corner rests against the straight segments 62, 64 when the top 16 leans against the corner, as shown in FIG. 29, with the corner extending into the first rectangular slot 27 and the second rectangular slot 29, if necessary.

The first cushion 70 may be attached to the surface 24 of the first side 18 in the gap 22 at the thirteenth straight segment 62 and a second cushion 72 attached to the surface 24 of the first side 18 in the gap 22 at the fourteenth straight segment 64. The first and second cushions 70, 72 protect the corner 28 from being scratched or marred by the top 16 when the top 16 leans against the corner 28. The top 16 may have a third side 84 directly connected to the first side 18 and the second side 20 and a fourth side 86 directly connected to the first side 18 and the second side 20 and in parallel and spaced relationship with the third side 84. The first rail 12 may be permanently attached with a first fastener 80 to the third side 84, as shown in FIG. 27, and the second rail 14 maybe permanently attached with a second fastener 82, as shown in FIG. 26, to the fourth side 86. The ladder 10 may include a third cushion 74 attached to the surface 24 of the first side 18 at the seventh straight segment 50 and a fourth cushion 76 attached to the surface 24 of the first side 18 at the eighth straight segment 52.

The top 16 may have a middle portion 92 disposed between a perimeter 94 of the top 16 defined by the first, second, third and fourth sides 18, 20, 84, 86. The middle portion 92 may have a paint can indentation 96 and a second larger paint can indentation 97 to hold a paint can, a ramp 111 extending from the larger paint can indentation 97 for a user to more easily scoop up small parts such as screws or bolts that may have been put into the indentations, and a tool hole 90 to hold a tool, such as a screwdriver or pliers or drill. There may be several tool holes 90 in the middle portion 92 to accommodate a number of different types of tools.

The surface 24 of the first side 18 may have a fifteenth straight segment 66 that directly connects with the third side 84 and to the seventh straight segment 50 at an angle between 20° and 70°, and a sixteenth straight segment 68 that directly connects with the fourth side 86 and the eighth straight segment 52 at an angle between 20° and 70°. As shown in FIG. 8, the angular position of the seventh and eighth straight segments allow the seventh and eighth straight segments, and thus the top 16, to fit stably against an internal corner 98 when the top 16 leans against an internal corner 98. Additional cushions may be used as desired along the first side 18. When leaning against a wide surface, such as a wall 100 as shown in FIG. 9, the third cushion on the seventh straight segment and the fourth cushion on the eighth straight segment of the top 16 will rest against the wall 100. The FIGS. 6, 7, 8 and 9 show the embodiment of the top 16 with the V shape, but this top 16 with the rectangular slots, as shown in FIG. 23, could be used in the same way as depicted in FIGS. 6, 7, 8 and 9.

Figure 10:
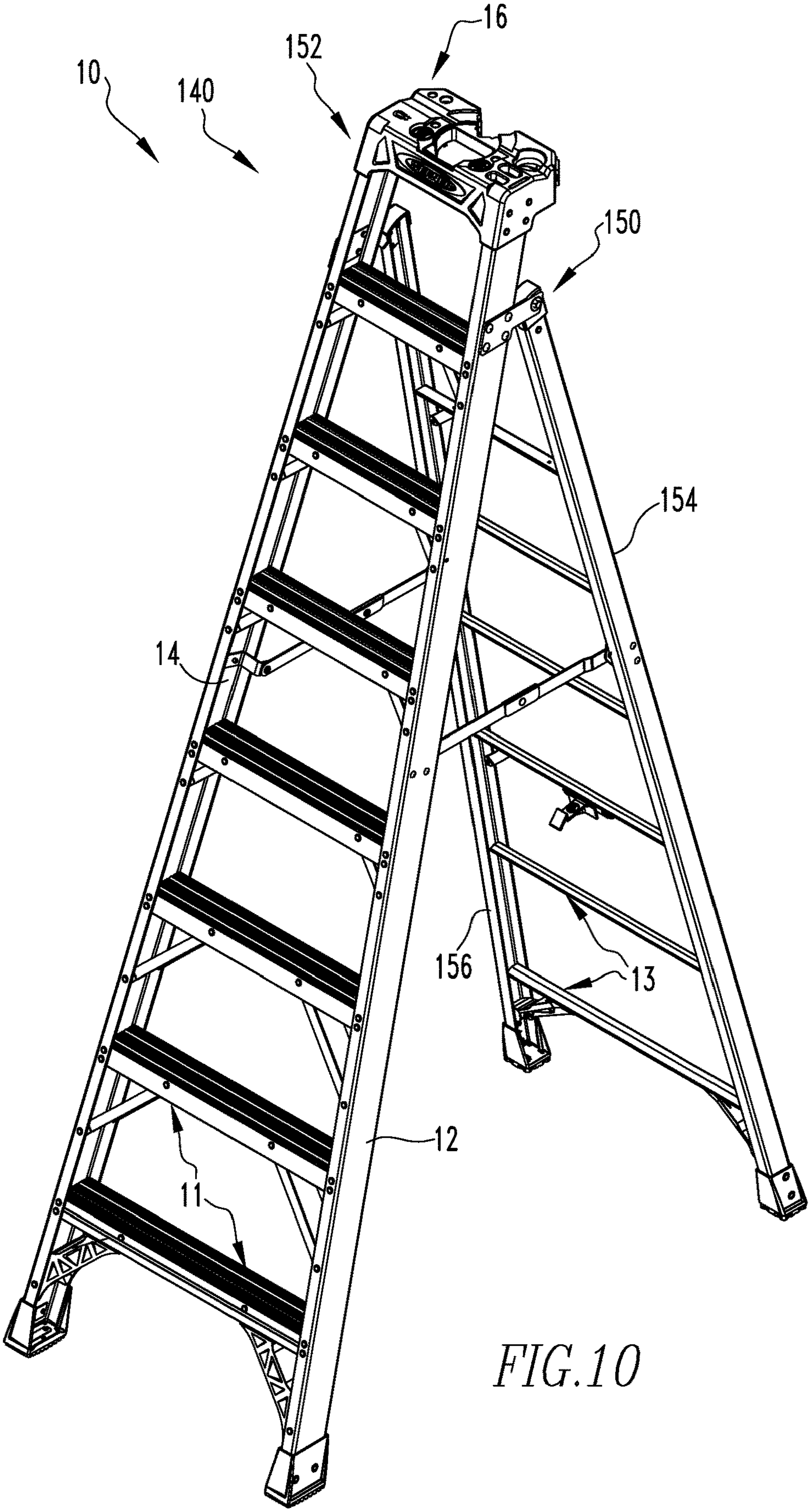
FIG. 10 is a perspective view of a stepladder of the present invention.
Figure 11:
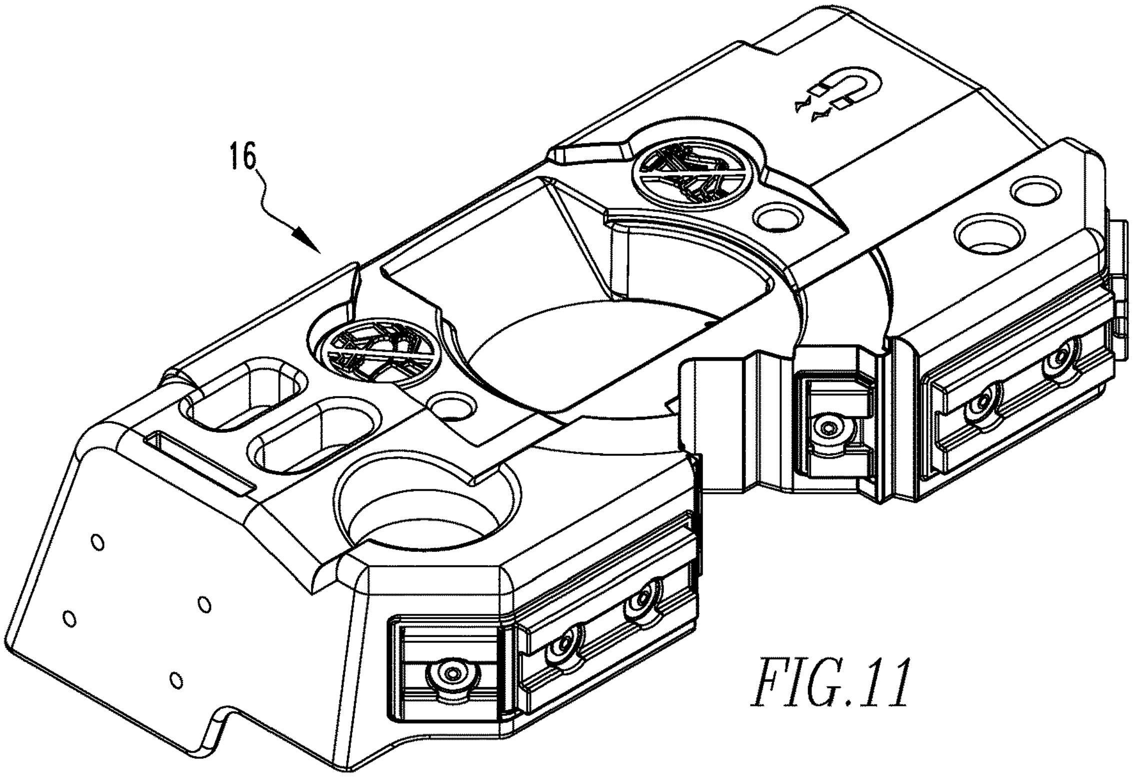
FIG. 11 is a perspective view of an alternative embodiment of the ladder top.
Figure 12:
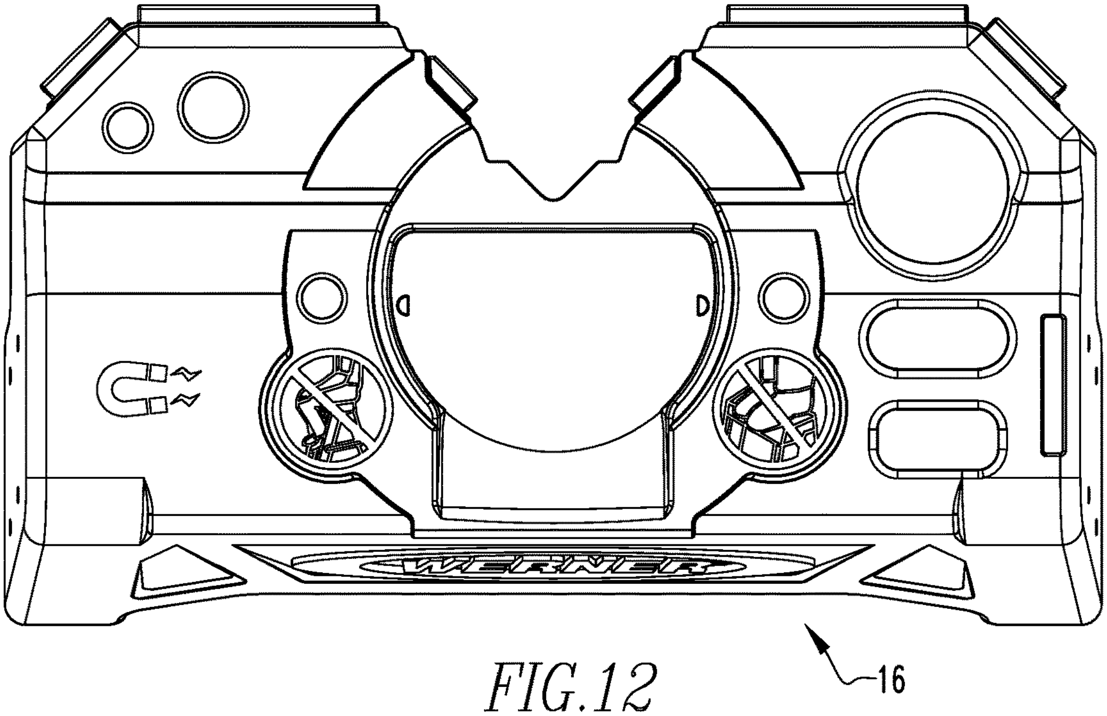
FIG. 12 is a top view of the alternative embodiment of the ladder top.
Figure 13:
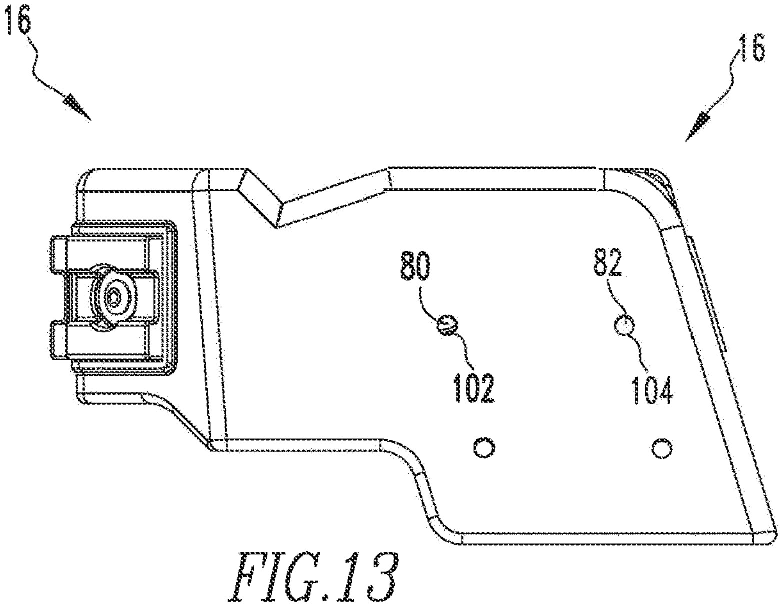
FIG. 13 is a left side view of the alternative embodiment of the ladder top.
Figure 30:
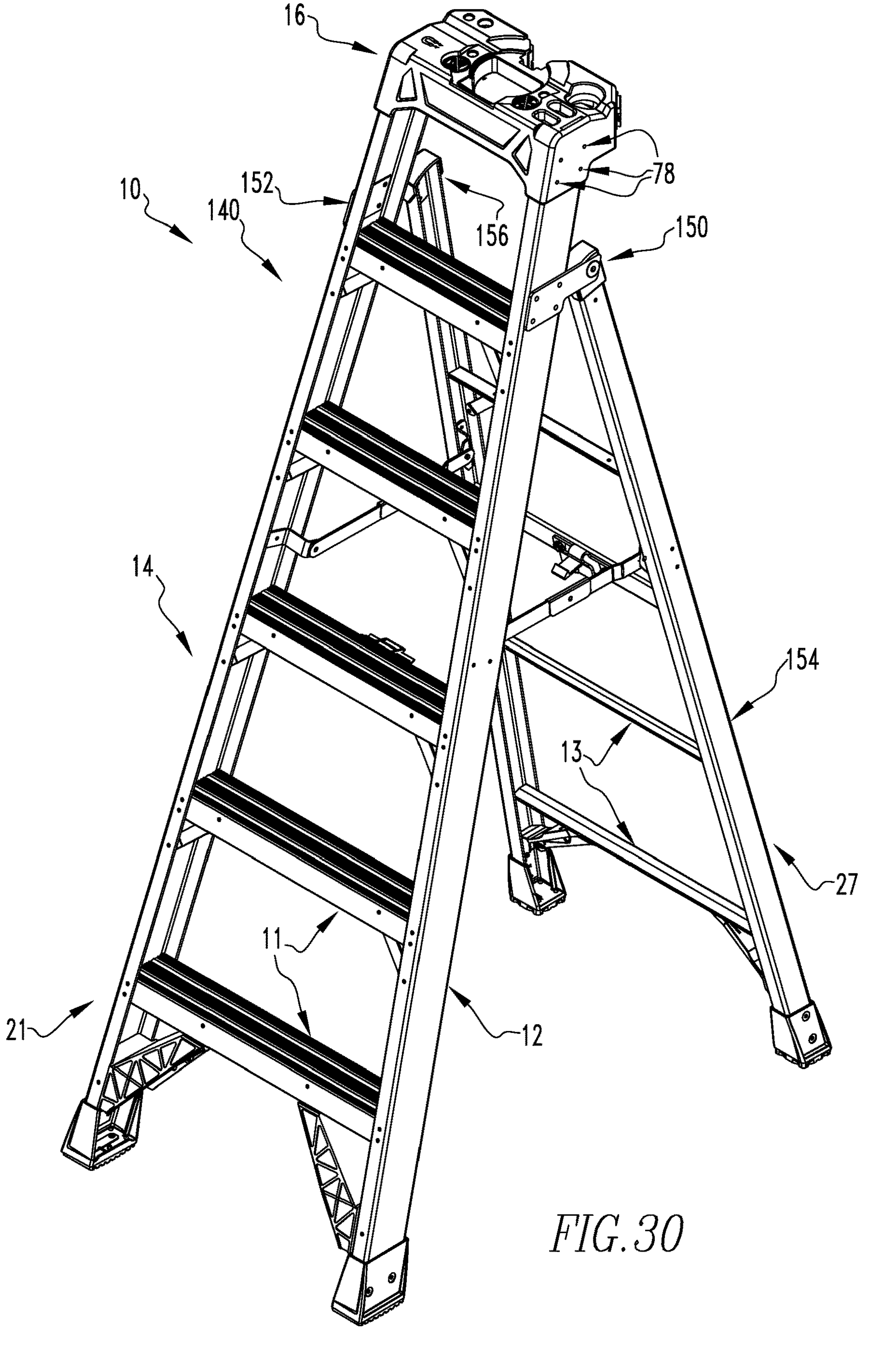
FIG. 30 is a perspective view of a step ladder with the top of FIG. 23.

The ladder 10 has a plurality of steps 11 attached to the first and second rails forming a front assembly 21, and a plurality of cross bars 13 attached to a third rail 154 and a fourth rail 156 forming a rear assembly 27, as shown in FIGS. 10 and 30.

The present invention pertains to a top 16 for a ladder 10 to be leaned against a first rectangular plank 34 or an external corner 28. The top 16, as shown in FIGS. 23 and 30, is attached to a first rail 12 and a second rail 14. The top 16 comprises a middle portion 92 having a perimeter 94 with a first side 18, second side 20, third side 84 and fourth side 86 extending down from the perimeter 94. The first side 18 has a gap 22 with a surface 24 with a first rectangular slot 27 and a second rectangular slot 29 extending from the first rectangular slot 27 so an external corner 28, as shown in FIG. 29 can fit into the first and second rectangular slots 27, 29 when the top 16 leans against the corner 28. The surface 24 of the first side 18 having a first notch 30 in the gap 22 so a first rectangular plank 34 can fit into the first notch 30 when the top 16 leans against the plank 34, as shown in FIG. 28. The first notch 30 has a width slightly larger than a width of the first plank 34. The top 16 being one piece and made of plastic and the cushions made of rubber. The third side 84 having a first fastener hole 102 to receive a first fastener 80 to permanently attach the first rail 12 to the third side 84, as shown in FIG. 27. The fourth side 86 has a second fastener hole 104 to receive a second fastener 82 to permanently attach the second rail 14 to the fourth side 86, as shown in FIG. 26.

Figure 2:
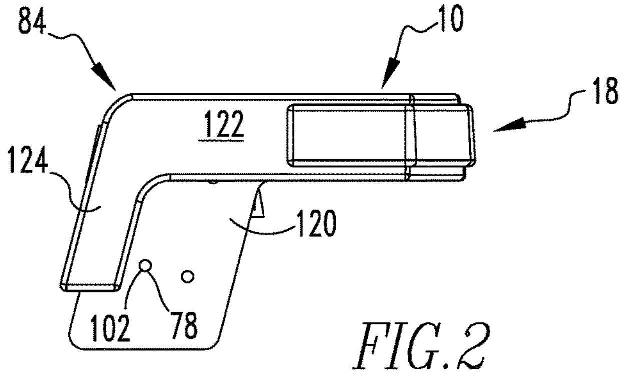
FIG. 2 shows a ladder with the ladder top.
Figure 4:
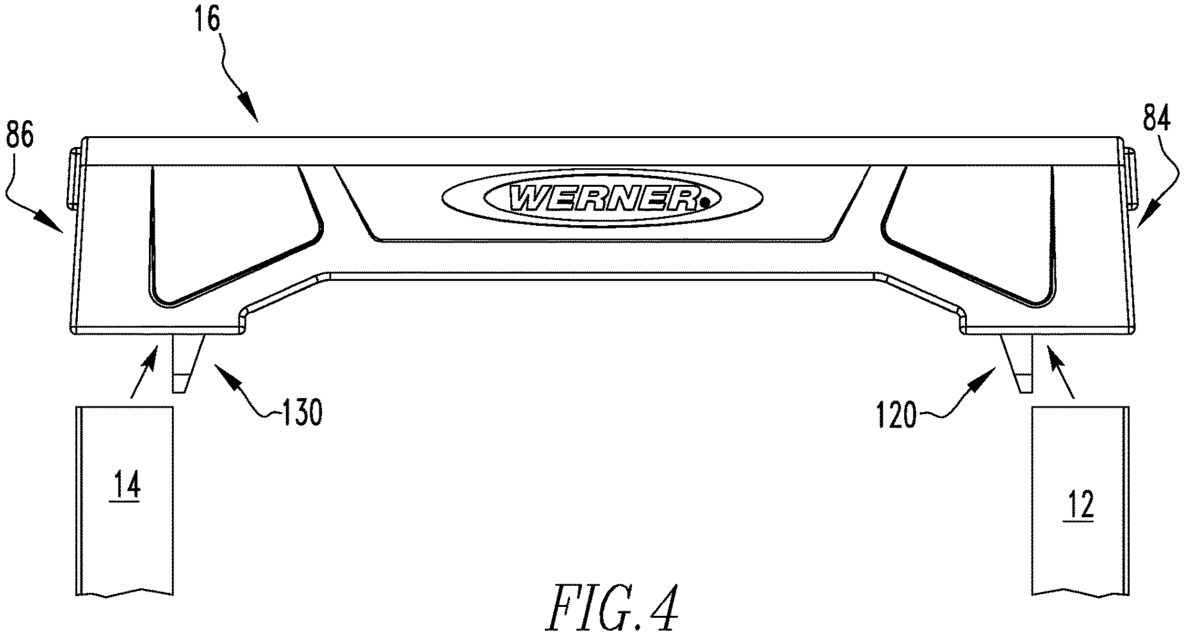
FIG. 4 shows a front view of the ladder top.
Figure 3:
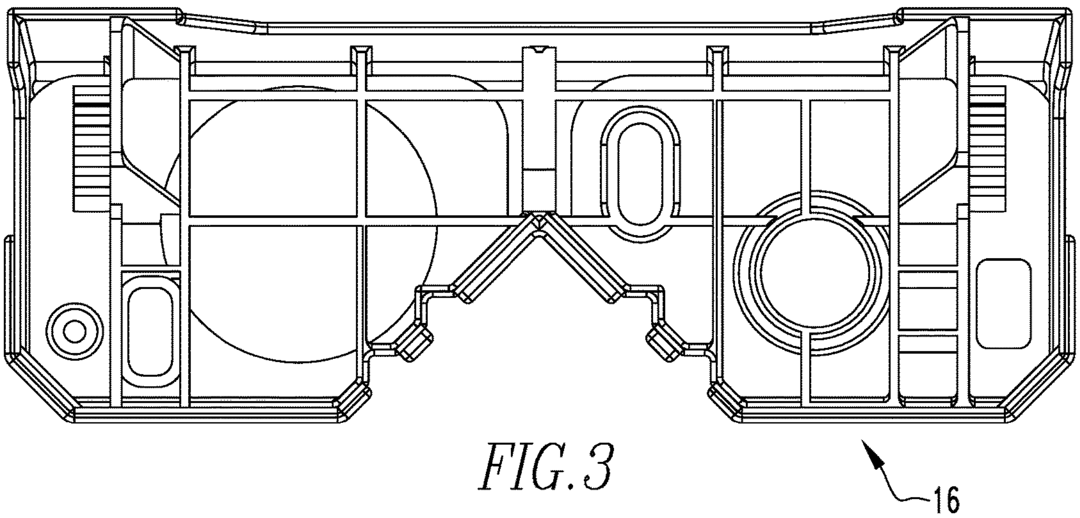
FIG. 3 shows an underside view of the ladder top.

As shown in FIG. 2 and FIG. 4, in this case for an extension ladder, the top 16 has a first flap 120 having a rectangular shape which conforms with the shape of the web of the top side of the first rail 12, and having a first fastener hole 102 that receives a first fastener 78 to fasten the first flap 120 to the web of the top side of the first rail 12. The first flap 120 extends down from the middle portion 92 of the top 16 near to and inside of the third side 84. The third side 84 has an L shape with a flat portion 122 that lines with and turns into the first side 18, and a lower portion 124 that extends down from the flat portion 122. The second side 20 extends down from the perimeter 94 the same distance as the lower portion extends down from the perimeter and forms a smooth continuous surface with the lower portion. In the space created between the first flap 120 and the lower portion 124 the top side of the first rail 12 fits and is essentially protected somewhat on the outside from the lower portion 124 and at the front from the second side 20 and from the inside by the first flap 120. The second rail 14 is similarly attached to a second flap 130 in spaced relationship with the fourth side 86. In this manner, the top 16 attaches to the first and second rails of an extension ladder. It should be noted, the C shape of the rails face outward since they engage with rails of the lower section of the extension ladder whose cross-sectional shape faces inwards. The flaps are necessary to provide a flat mounting surface to the web of the rails of the top section of the extension ladder since only the edges of the flanges of the rails contact the third and fourth sides in the extension ladder embodiment.

In this manner, the ladder top 16 can also be attached to a step ladder 140, as shown in FIG. 10, where the stepladder has a first hinge 150 that attaches to and extends from the first rail 12 and a second hinge 152 that attaches to and extends from the second rail 14. The first and second hinges are in spaced relation with the ladder top 16. A third rail 154 attaches to the first hinge 150 and a fourth rail 156 attaches to the second hinge 152. The third rail 154 in the fourth rail 156 are able to move between an open, use position, and a closed position with the first hinge 150 and second hinge 152, respectively, as is well known in the art. There are rungs or cross bars 13 attached to the third and fourth rails, as well as brackets which fold attached between the first rail 12 and the third rail 154, and between the second rail 14 and the fourth rail 156. When the stepladder is in a closed position, with the rails essentially in parallel with each other, the stepladder can be leaned on the top 16 against structures, such as described above, with the notches for planks and the first and second rectangular slots for an external corner and the angled corner segments for an internal corner, and be more securely kept in position without sliding or falling over.

FIGS. 11-14 and 23-29 show additional embodiment of the top 16 that is preferably used with the stepladder embodiment. Note, there are no flaps, but instead, the first rail 12 attaches to the third side 84 with fasteners 78 extending through fastener holes in the third side 84 and the first rail 12; and the second rail 14 attaches to the fourth side 86 with fasteners 78 extending through fastener holes in the fourth side 86, and the second rail 14. In the stepladder embodiment, the C shape cross section of the rails face inward, so the web of the rails contact directly the third and fourth sides of the top and no flaps are needed. See U.S. patent application Ser. No. 15/802,949 having docket number WERNER-153 CIP, contemporaneously filed with this application, and incorporated by reference herein, for additional details regarding a stepladder.

Figure 15:
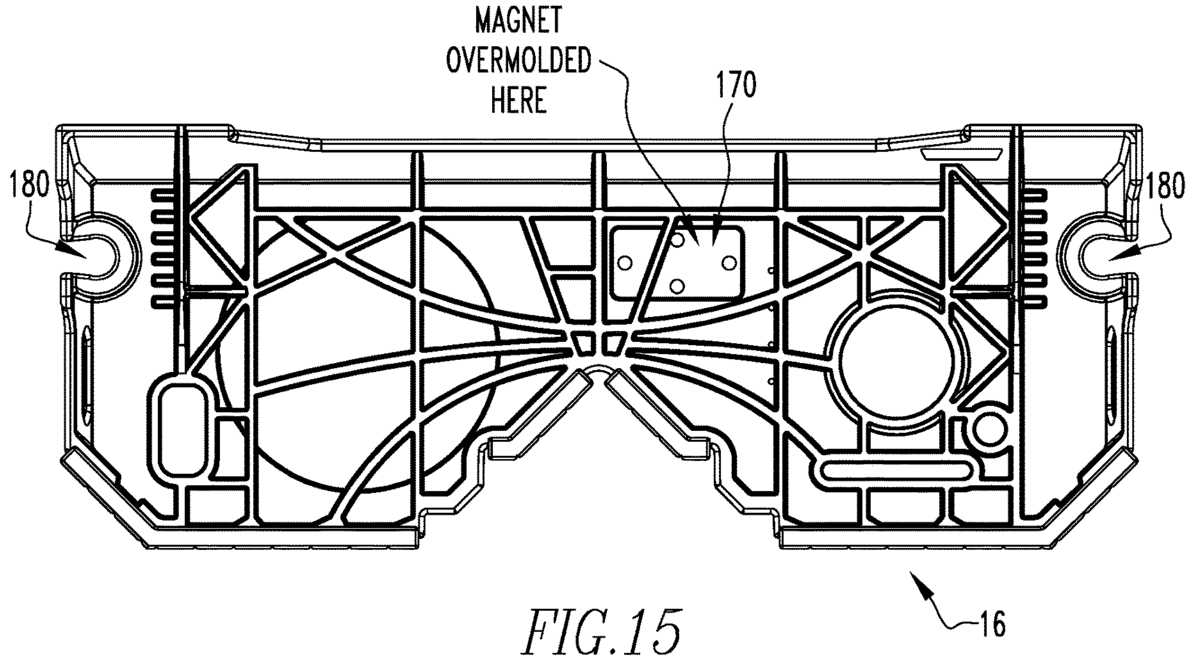
FIG. 15 is a bottom view of a second alternative embodiment of the ladder top.
Figure 16:
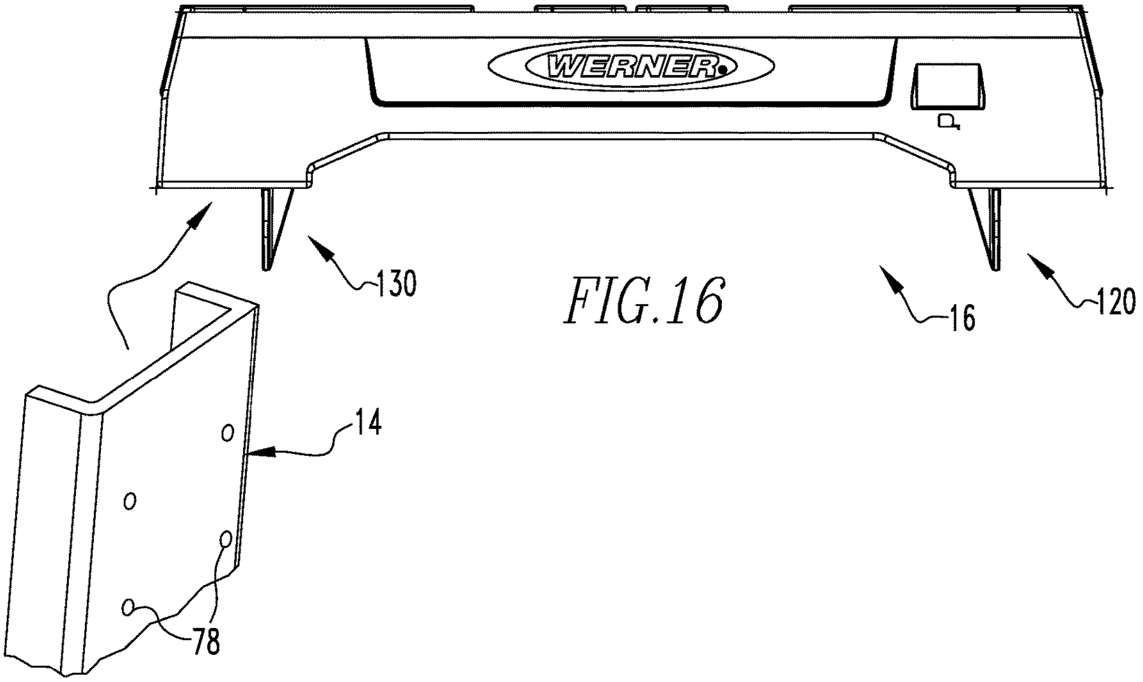
FIG. 16 is a front view of the second alternative embodiment of the ladder top.
Figure 17:
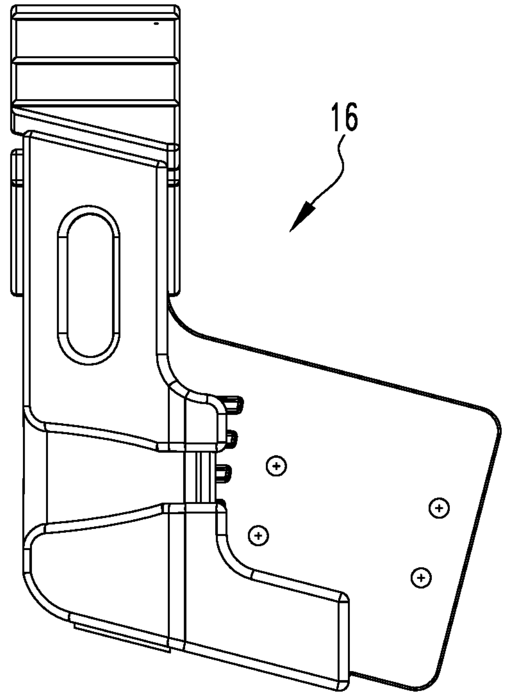
FIG. 17 is a right side view of the second alternative embodiment of the ladder top.
Figure 18:
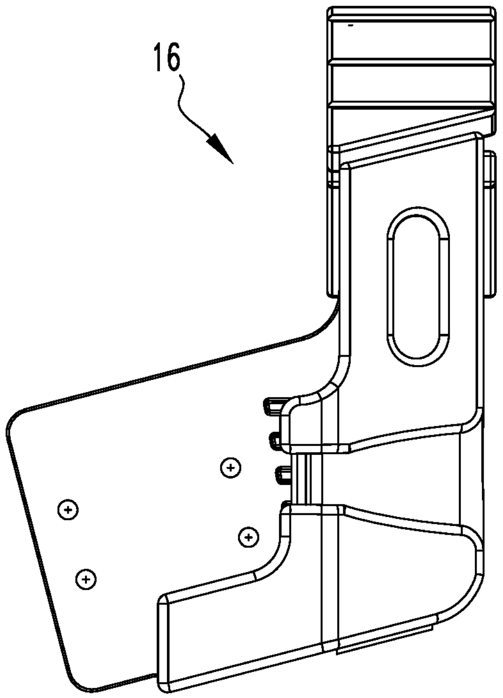
FIG. 18 is a left side view of the second alternative embodiment of the ladder top.
Figure 19:
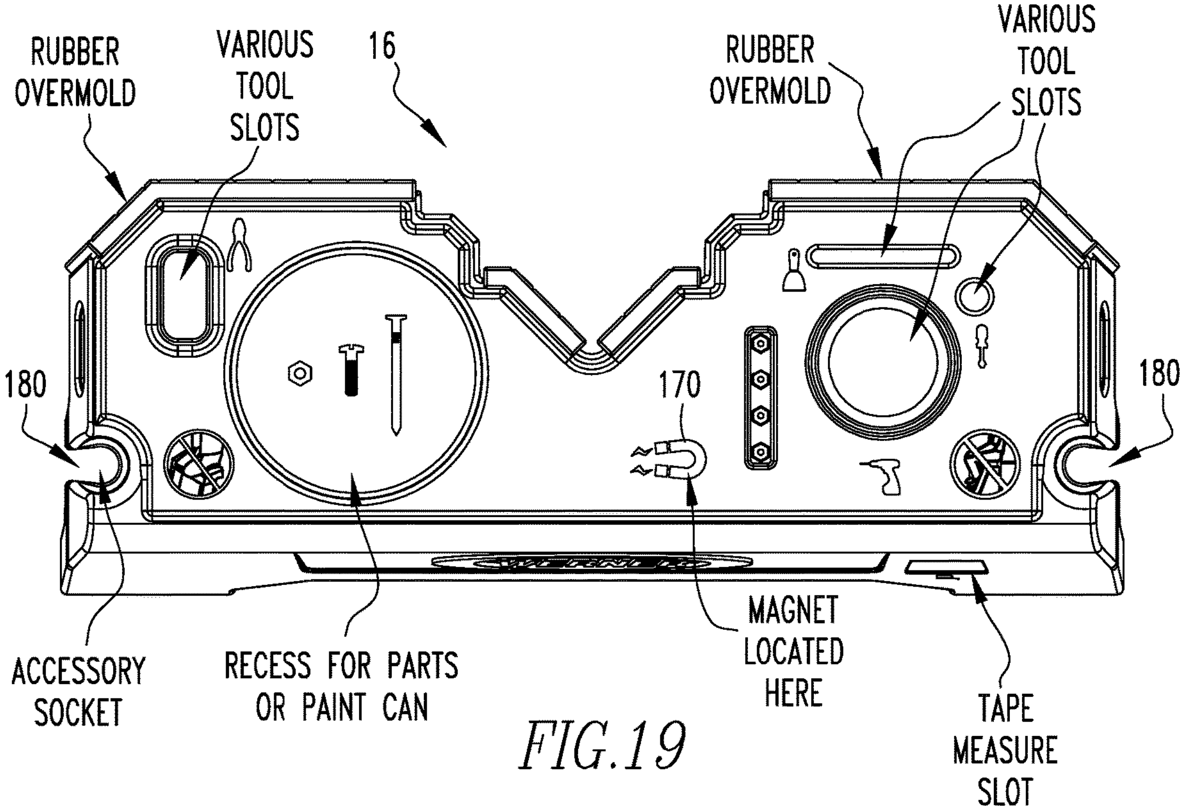
FIG. 19 is an overhead view of the second alternative embodiment of the ladder top.
Figure 20:
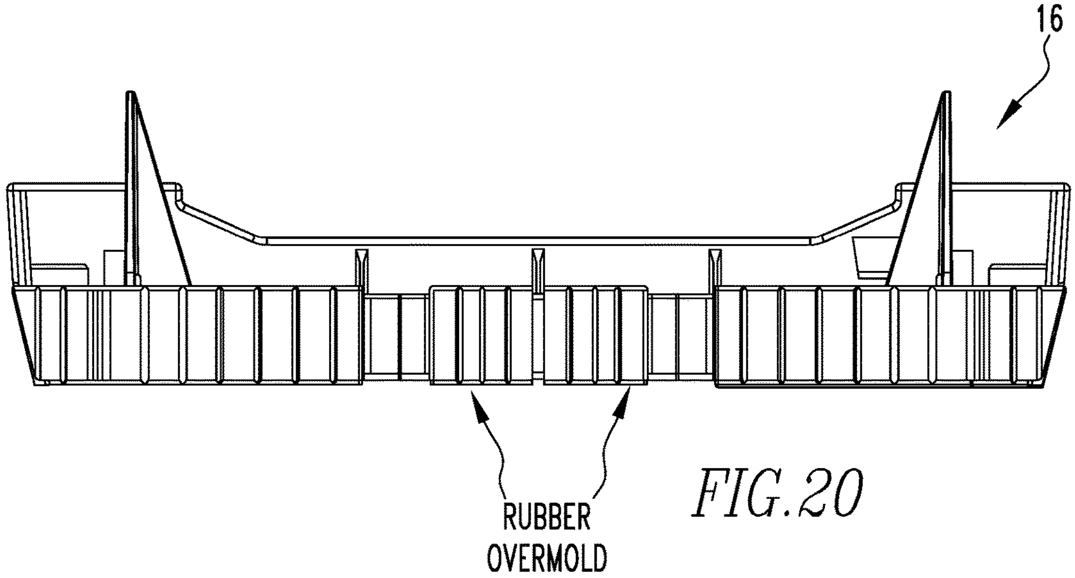
FIG. 20 is a rear view of the second alternative embodiment of the ladder top.
Figure 21:
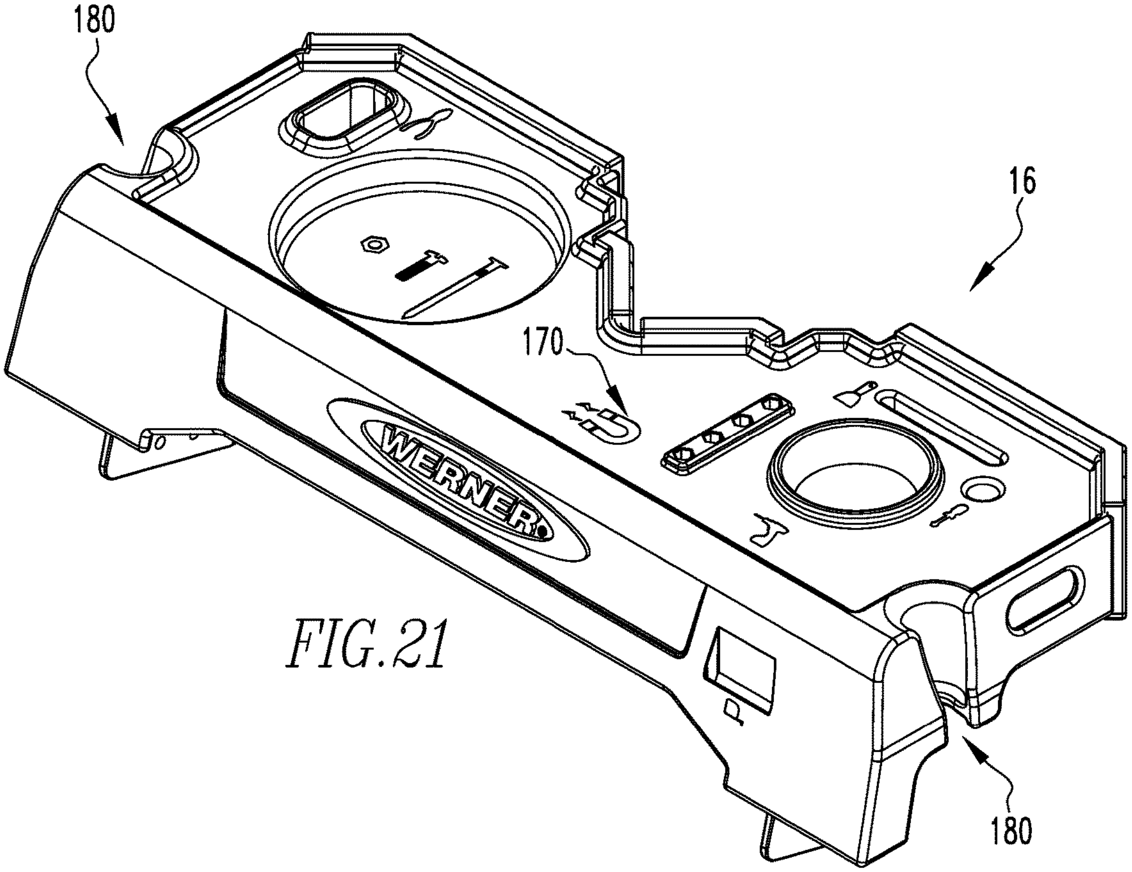
FIG. 21 shows a front perspective view of the second alternative embodiment of the ladder top.
Figure 22:
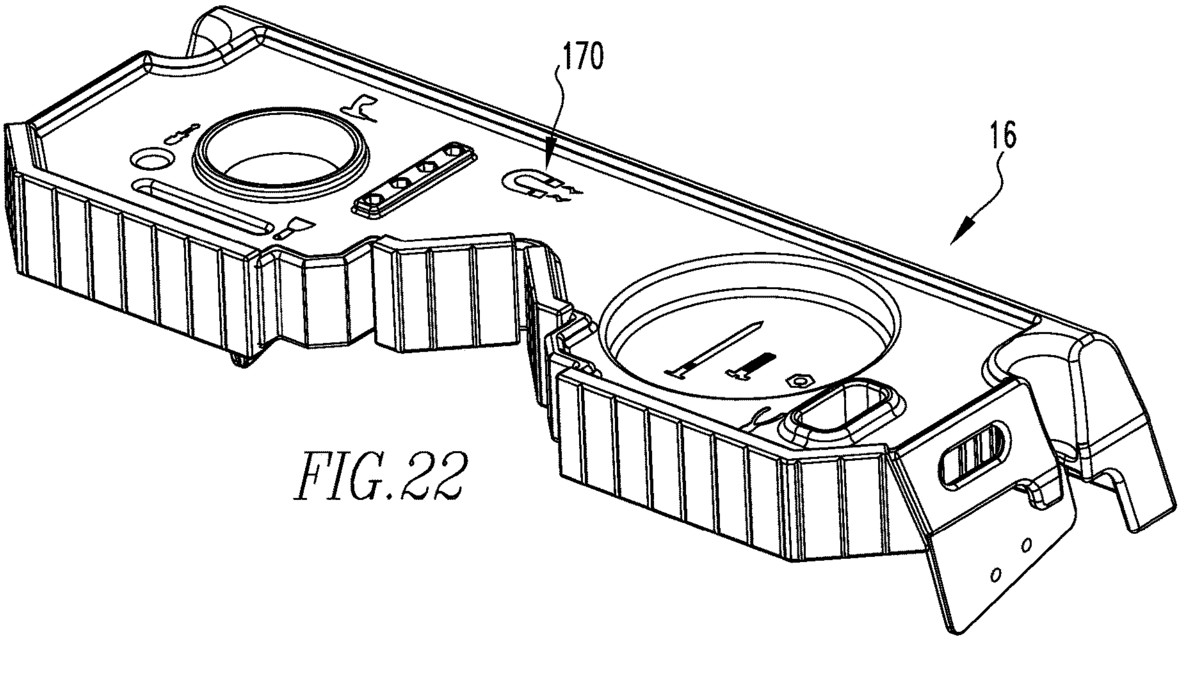
FIG. 22 shows a rear perspective view of the second alternative embodiment of the ladder top.

FIGS. 15-22 show a second alternative embodiment of the top 16 having bungee slots 180 in the third side 84 and forth side 86 for holding tools with bungee straps. In addition, a magnet 170 is completely encapsulated in the top 16, as shown in FIGS. 15 and 19. When the top 16 is being formed, the magnet, which is a single solid element, is placed on pins in the mold so that when the molten plastic fills the mold it encompasses the magnet. The top shown in FIGS. 23-29 can also be used on an extension ladder and include flaps 120 and 130, as described above. When used with a stepladder, since the C shaped cross-section of the rails face inward, the web of the rails are then positioned flat against the respective third and fourth sides, so there is a wide mounting surface to fix the rails to the third and fourth sides of the top, and no flaps are needed. Again, in an extension ladder, the C shaped cross section of the rails face outward, so the flaps are needed to fix the rails to the top.

The present invention pertains to a method for using a ladder 10. The method comprises the steps of moving the ladder 10 to a first rectangular plank 34. There is the step of leaning the ladder 10 against the first rectangular plank 34 so the rectangular plank 34 is disposed in a first notch 30 in a gap 22 in a first side 18 of a plastic top 16 directly attached to a first rail 12 and a second rail 14 with fasteners 78, as shown in FIGS. 23 and 30. The top 16 has a second side 20. The first side 18 has the gap 22 which has a surface 24 with a first rectangular slot 27 and a second rectangular slot 29 extending from the first rectangular slot 27 so an external corner 28, as shown in FIG. 29 can fit into the first and second rectangular slots 27, 29 when the top 16 leans against the corner 28. The surface 24 of the first side 18 having the first notch 30 in the gap 22. The first notch 30 having a width slightly larger than a width of the first plank 34.

In the operation of the invention, in one embodiment, a molded top 16 fits on the upper rail ends of the fly section of an extension ladder 10. The top 16 has locations at its middle portion 92 to permit the temporary placement of tools when the user is working at the upper end of the ladder 10. The back or first side 18 of the top 16 is specifically designed so that the ladder 10 may be leaned against a wide flat surface, such as a wall 100 as shown in FIG. 9, may be leaned against an external corner 28 as shown in FIG. 29, and may be leaned against and closely engage a rectangular plank, such as 6" wide or 2" wide lumber as shown in FIGS. 6 and 28.

When leaning against an external corner 28, the V shape of the external corner 28 fits into the first and second slots of the top 16 formed by the first straight segment 38 and the second straight segment 40 and the bottom straight segment 88.

Similarly, when the top 16 leans against an internal corner 98, the fifteenth straight segment 66 and the sixteenth straight segment 68, which directly connect to and form an angle of about 45° with the seventh straight segment 50 and the eighth straight segment 52, respectively, stably rest against and align with the walls that form the internal corner 98. In this way the top can be disposed in an internal corner for a user to use, with a greater surface area of the top 16 contacting the walls of the internal corner 98 than if the fifteenth and sixteenth straight segments did not exist or were not that about a 45° angle relative to the seventh and eighth straight segments.

Outside the gap 22 on either side of the top 16 there is a third cushion 74 and fourth cushion which will contact a flat section, such as a wall, when the top 16 leans against the wall. The third and fourth cushions 74, 76 protect the wall from being marred or scratched by the top 16 when the top 16 leans against the wall.

Figure 31:
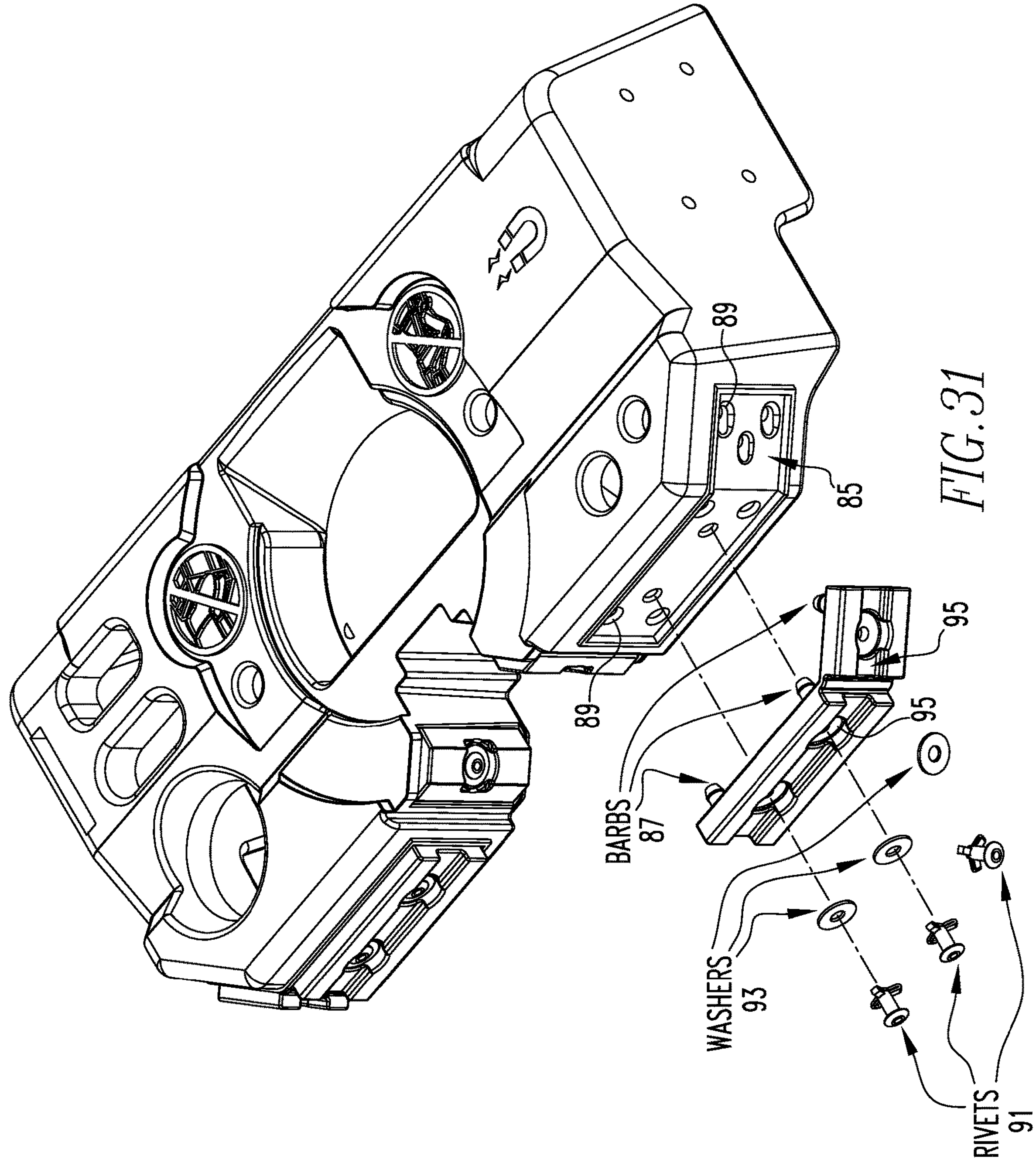
FIG. 31 is a partially exploded view of the top and the cushions.
Figure 32:
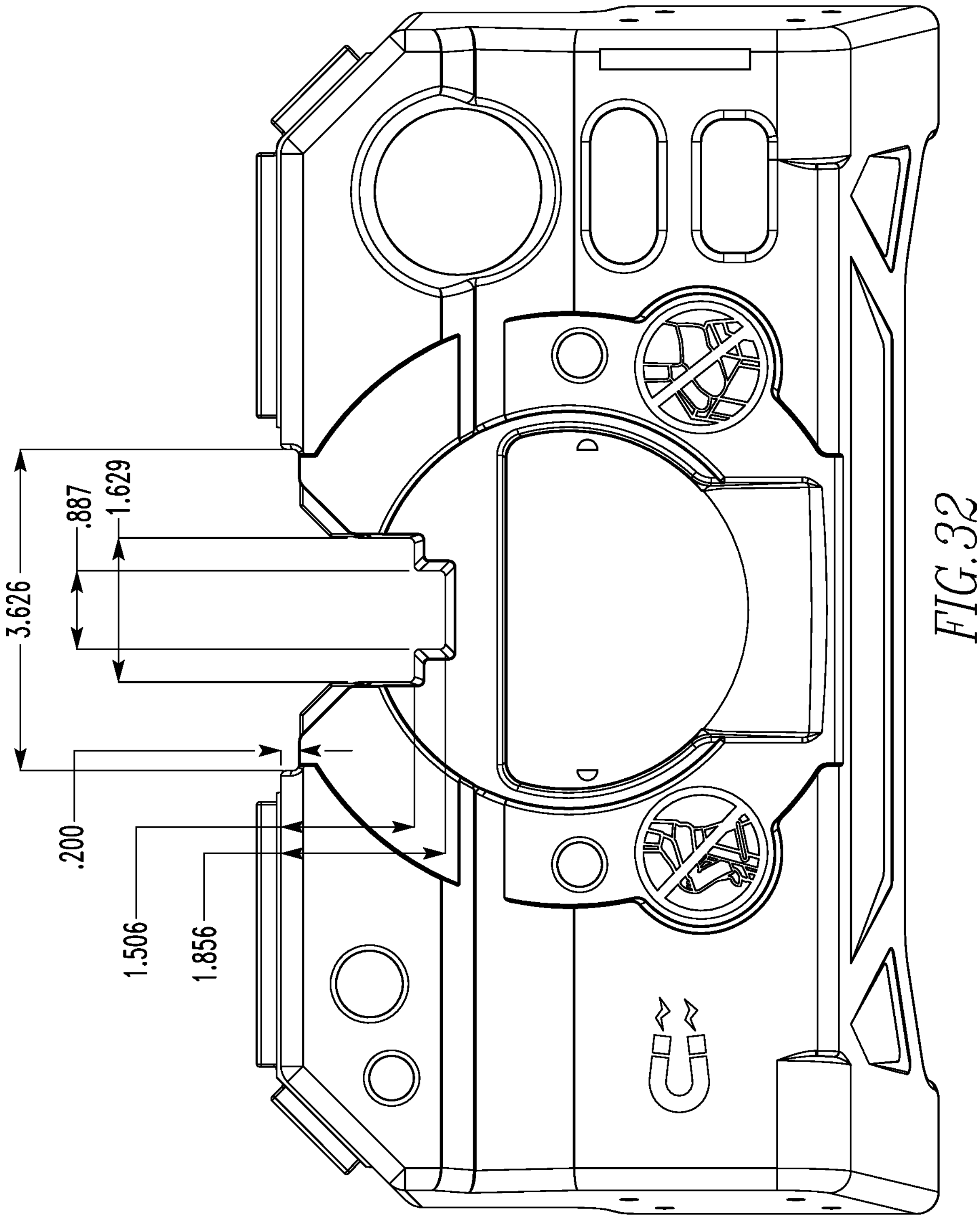
FIG. 32 shows preferred dimensions of aspects of the gap of the top.

FIG. 31 shows an alternative embodiment of attaching the cushions to the top. The top, when formed, has inserts 85 which conform to the cushions that will fit into the inserts 85. The cushions have barbs 87 which fit through barb holes 89 to hold the cushions in place in the inserts 85. Once the cushions are positioned in the inserts 85, pop rivets 91 extend through washers 93 positioned in rivet holes 95 in the cushions to attach the cushions to the top. The pop rivets have their ends extend perpendicularly to their axis, as is well known in the art, to permanently attach the cushions to the top. FIG. 32 identifies preferred embodiments and various aspects of the gap in the top. The top 16 may be one continuous piece with the cushions attached to it by fasteners.

See U.S. patent application Ser. No. 15/802,949, incorporated by reference herein, describing a stepladder that leans upright against an object in a folded position.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A ladder comprising:

a first rail;

a second rail; and a top attached to the first rail and second rail, the top including a first side and a second side, the first side including a surface and a gap, the gap including a first rectangular slot and a second rectangular slot extending from the first rectangular slot, the first rectangular slot and the second rectangular slot are configured to receive an external corner of a structure, the surface of the first side including a first notch in the gap such that a first rectangular plank can fit into the first notch, the first notch including a first width, the first side of the top including a first edge that includes a flat surface and angled corners, the angled corners of the top are configured to fit against walls having an internal corner of the structure when the top leans against the internal corner, wherein the top includes a plurality of openings extending through the first side and a pair of discrete and spaced apart cushions configured to contact a surface to avoid marring the surface, and including barbs extending therefrom, wherein the barbs are disposed through the openings in the first side of the top, each discrete cushion of the pair of discrete and spaced apart cushions disposed on and continuously extending along both the flat surface of the first edge and the angled corners of the first edge.

2. The ladder of claim 1 wherein each discrete cushion of the pair of discrete and spaced apart cushions is coupled to the third side using an adhesive.

3. The ladder of claim 1 wherein each discrete cushion of the pair of discrete and spaced apart cushions is coupled to the third side using the barbs and an adhesive.

4. A ladder comprising:

a first rail coupled to a second rail via a first plurality of rungs;

a third rail coupled to a fourth rail via a second plurality of rungs, the third rail and the fourth rail being connected to the first rail and the second rail via a hinge;

a ladder top coupled to at least the first rail and the second rail, wherein the ladder top includes a first side, a second side, a third side, and a fourth side, wherein the third side is coupled to the first rail and fourth side is coupled to the second rail;

wherein the first side and the second side are substantially parallel to one another and coupled to the third side and the fourth side of the ladder top, and the ladder top also includes a top surface coupled to the first side, the second side, the third side, and the fourth side, wherein the first side includes a gap with a stepped configuration, a first edge with a flat surface and angled corners, and two discrete and spaced apart pads, wherein the stepped configuration includes a first notch and at least one additional notch on each side of the first notch within the gap, and wherein the two discrete and spaced apart pads are configured to avoid marring of a surface when placed into contact therewith, wherein the first side includes openings extending through the first side and configured to receive protrusions extending from an edge of the two discrete and spaced apart pads to couple the two discrete and spaced apart pads to the first side, and wherein the two discrete and spaced apart pads are each partly disposed on and continuously extend along both the flat surface of the first edge and the angled corners of the first edge, each of the two discrete and spaced apart pads including:

at least one corner protrusion extending from the edge thereof and configured to be received in an opening in the angled corner of the first edge, and at least two surface protrusions extending from the edge thereof and configured to be received in respective openings in the flat surface of the first edge.

5. The ladder of claim 4 wherein the gap with the stepped configuration includes at least three contact surfaces and wherein third and fourth discrete and spaced apart pads are disposed on two of the contact surfaces of the gap with the stepped configuration, wherein the third and fourth discrete and spaced apart pads disposed on the two of the contact surfaces of the gap with the stepped configuration are configured to receive an external corner when the ladder is leaned against the external corner.

6. The ladder of claim 4 wherein the two discrete and spaced apart pads are configured to contact a wall when the ladder is leaned against the wall.

7. The ladder of claim 4 wherein the two discrete and spaced apart pads are configured to contact each side of an internal corner when the ladder is leaned against the internal corner.

8. The ladder of claim 4 wherein the two discrete and spaced apart pads are coupled to the first side via a chemical bond and the at least one corner protrusion and the at least two surface protrusions.

9. The ladder of claim 4 wherein the top surface includes a magnet disposed therein.

10. The ladder of claim 4 wherein the top surface includes tool slots.

11. The ladder of claim 4 wherein the gap with the stepped configuration includes multiple surfaces configured such that the ladder can be leaned against surfaces having various widths, wherein the various widths are narrower than at least one of the multiple surfaces.

12. The ladder of claim 4 wherein the gap with the stepped configuration is configured to receive various non-circular widths of material to aid in stabilizing the ladder against the various non-circular widths.

13. The ladder of claim 4 wherein the angled corners extend between the first side and the third side and the fourth side at approximately a 45 degree angle.

14. The ladder of claim 4 wherein the two discrete and spaced apart pads disposed on at least a portion of the first edge extending from the flat surface to the angled corners span approximately half of a length of each of the angled corners.

15. The ladder of claim 4 wherein the two discrete and spaced apart pads disposed on at least a portion of the first edge extending from the flat surface to the angled corners span approximately a full length of the first side.

16. The ladder of claim 4 wherein the top surface includes an indentation configured to hold tools or materials placed therein.

17. The ladder of claim 4 wherein the gap with the stepped configuration includes two substantially rectangular slots, a first rectangular slot and a second rectangular slot disposed within the first rectangular slot.

* * * * *